(12) United States Patent
Kuchi et al.

(10) Patent No.: US 9,312,978 B2
(45) Date of Patent: Apr. 12, 2016

(54) PILOT AIDED DATA TRANSMISSION AND RECEPTION WITH INTERFERENCE MITIGATION IN WIRELESS SYSTEMS

(71) Applicants: Kiran Kumar Kuchi, Chennai (IN); Jeniston Deviraj Klutto Milleth, Chennai (IN); Vinod Ramaswamy, Chennai (IN); Baskaran Dhivagar, Chennai (IN); Dileep Manisseri Kalathil, Chennai (IN); Krishnamurthi Giridhar, Chennai (IN); Bhaskar Ramamurthi, Chennai (IN); Padmanabhan Madampu Suryasarman, Chennai (IN); Geordie George, Chennai (IN); Prasanth Karunakaran, Chennai (IN); Yerrapareddy Sivakishore Reddy, Chennai (IN)

(72) Inventors: Kiran Kumar Kuchi, Chennai (IN); Jeniston Deviraj Klutto Milleth, Chennai (IN); Vinod Ramaswamy, Chennai (IN); Baskaran Dhivagar, Chennai (IN); Dileep Manisseri Kalathil, Chennai (IN); Krishnamurthi Giridhar, Chennai (IN); Bhaskar Ramamurthi, Chennai (IN); Padmanabhan Madampu Suryasarman, Chennai (IN); Geordie George, Chennai (IN); Prasanth Karunakaran, Chennai (IN); Yerrapareddy Sivakishore Reddy, Chennai (IN)

(73) Assignee: Centre of Excellence in Wireless Technology, Chennai (IN)

( * ) Notice: Subject to any disclaimer, the term of this patent is extended or adjusted under 35 U.S.C. 154(b) by 0 days.

(21) Appl. No.: 14/684,430

(22) Filed: Apr. 12, 2015

(65) Prior Publication Data
US 2015/0215063 A1 Jul. 30, 2015

Related U.S. Application Data

(62) Division of application No. 13/254,849, filed as application No. PCT/IN2010/000124 on Mar. 3, 2010, now Pat. No. 9,030,992.

(30) Foreign Application Priority Data

Mar. 4, 2009 (IN) .............................. 472/CHE/2009
Aug. 13, 2009 (IN) ........................... 1930/CHE/2009
Aug. 28, 2009 (IN) ........................... 2093/CHE/2009
Aug. 28, 2009 (IN) ........................... 2095/CHE/2009
Nov. 16, 2009 (IN) ........................... 2815/CHE/2009

(51) Int. Cl.
*H04W 80/04* (2009.01)
*H04W 88/06* (2009.01)
(Continued)

(52) U.S. Cl.
CPC ............. *H04J 11/005* (2013.01); *H04L 5/0023* (2013.01); *H04L 5/0057* (2013.01); *H04L 25/0236* (2013.01)

(58) Field of Classification Search
CPC ..... H04W 80/04; H04W 88/06; H04W 28/04; H04W 72/04
USPC .................................................. 370/328, 329
See application file for complete search history.

(56) References Cited

U.S. PATENT DOCUMENTS

| | | |
|---|---|---|
| 2002/0034158 A1 | 3/2002 | Wang et al. |
| 2002/0136274 A1 | 9/2002 | Proctor et al. |
| 2004/0166887 A1 | 8/2004 | Laroia et al. |
| 2004/0179627 A1 | 9/2004 | Ketchum et al. |
| 2006/0255989 A1 | 11/2006 | Kim et al. |

(Continued)

FOREIGN PATENT DOCUMENTS

WO PCTIN2010000124 3/2010

*Primary Examiner* — Ronald B Abelson
(74) *Attorney, Agent, or Firm* — Rahman LLC

(57) ABSTRACT

Embodiments disclosed herein reduce interference at pilot symbols and also enable good interference measurements by using a combination pilot tones and null tones along with null tones. In this type of system, the receivers estimate the channel state information without any strong interference from the neighboring transmitters, and at the same time it can also measure either the individual interference channel states or the interference covariances from the silent periods. It uses these measurements thus obtained to calculate the post processing SINR, and then compute and report the wideband and subband CQIs to the transmitter. The groups of transmitters are reused in geographically separated region using a frequency reuse structure. In a preferred implementation, pilot signal is precoded using a multi-antenna precoder. The precoder may be same for pilot and data.

25 Claims, 30 Drawing Sheets

(51) Int. Cl.
*H04W 28/04* (2009.01)
*H04W 72/04* (2009.01)
*H04J 11/00* (2006.01)
*H04L 25/02* (2006.01)
*H04L 5/00* (2006.01)

(56) References Cited

U.S. PATENT DOCUMENTS

2009/0042511 A1 2/2009 Malladi
2009/0047969 A1 2/2009 Lee et al.
2011/0019770 A1* 1/2011 Gorokhov et al. ............ 375/296

* cited by examiner

PILOT AIDED DATA TRANSMISSION AND RECEPTION WITH INTERFERENCE MITIGATION IN WIRELESS SYSTEMS

CROSS REFERENCE TO RELATED APPLICATIONS

This application is a divisional of U.S. patent application Ser. No. 13/254,849, filed on Sep. 4, 2011, which claims priority to PCT Application No. PCT/IN2010/000124, filed on Mar. 3, 2010, which further claims priority to Indian Provisional Application No. 472/CHE/2009 filed on Mar. 4, 2009, Indian Application No. 1930/CHE/2009 filed on Aug. 13, 2009, Indian Provisional Application No. 2093/CHE/2009 filed on Aug. 28, 2009, Indian Provisional Application No. 2095/CHE/2009 filed on Aug. 28, 2009, and Indian Provisional Application No. 2815/CHE/2009 filed on Nov. 16, 2009, the contents of which in their entireties, are herein incorporated by reference.

TECHNICAL FIELD

This invention relates to wireless communications and more particularly to pilot design with interference mitigation in wireless systems.

BACKGROUND

A wireless network generally comprises of many smaller cells to cover the whole service area. Each cell is further divided into multiple sectors. Each cell/sector may have a base station (BS) and multiple mobile stations (MSs). Cellular system with 3-sectors per cell is depicted in FIG. 1. The MSs in a sector may be fixed, nomadic or mobile. Communication from a BS to an MS is called as downlink or forward link. Similarly, communication from an MS to a BS is called as uplink or reverse link. In IEEE 802.16m system a BS is denoted as advanced BS (ABS) and an MS is denoted as advanced MS (AMS). Similarly in LTE/LTE-Advanced a BS is denoted as e-NodeB and a MS is denoted as UE.

The IEEE 802.16m, LTE and LTE-Advanced are broadband wireless standards that use Orthogonal Frequency Division Multiplexing Access (OFDMA) technology in the downlink. The block diagram of an OFDMA based system is shown in FIG. 2. The IEEE 802.16m uses OFDMA, and the LTE/LTE-Advanced use DFT spread OFDMA (a.k.a. SCFDMA) technology in the uplink.

In the IEEE 802.16m, LTE and LTE-Advanced standards, resources are allocated in a time-frequency grid called a resource block (RB) or physical resource unit (PRU) that consists of P subcarriers and Q OFDM symbols or multiples of P subcarriers and Q OFDM symbols. The value of P and Q can be any integer, and the value of P and Q are dependent on the individual standards. The P subcarriers can be physically contiguous or distributed, and in case of distributed, permutation can be subcarrier wise or groups of subcarrier wise.

In the downlink, one or more RBs may be intended for single or group of users; in the uplink, a transmitter may be assigned one or more RBs and several transmitters may transmit simultaneously. The PSK/QAM input data are mapped to distinct subcarriers, and filled with zeros in the unused subcarriers before taking an N-point IDFT.

When the P subcarriers are adjacent, it is possible to do Channel Dependent multi-user Scheduling (CDS) and improve the throughput of the system. In CDS, users requesting resources with good channel quality are given preference in scheduling. In distributed modes, the P subcarriers are distributed over the entire available bandwidth (for instance, in a pseudo-random fashion that can include fast hopping across the tones) and interference from adjacent tones is averaged and frequency diversity is exploited inherently.

The localized resource unit, also known as Contiguous Resource Unit (CRU) contains a group of subcarriers which are contiguous across the localized resource allocations. The minimum size of the CRU equals the size of the PRU, i.e., P subcarriers by Q OFDMA symbols. The resource allocated to a user or a group of users will be in multiples of the basic resource units, and it can be either contiguous or distributed. N1 contiguous basic resource units are called as sub-band, and N2 contiguous resource units are called as mini-band in IEEE 802.16m standards. N1 and N2 are positive integers. Typical number for N1 is 3, 4 or 5 and N2 is 1 or 2. The miniband CRUs available in a frequency partition can be divided into two groups. The first group can be used as miniband CRU itself, and the second group will be used to create subcarrier, or pairs of subcarrier, groups of subcarrier (tile) permuted distributed resource unit (DRU).

In the IEEE 802.16m systems, the total available physical resource is divided into logical resources to support scalability, multiple accesses. The logical resources are called as Logical Resource Units (LRU), and each LRU is composed of 18 contiguous CRU or pair-wise subcarrier permutation over the entire available bandwidth (DRU) and Q contiguous OFDM symbols. When LRU is composed of CRU, each LRU is further divided into miniband CRU (NLRU) with N2=1 and consisting of 18 contiguous subcarriers and subband CRU (SLRU) with N1=4 and consisting of 72 contiguous subcarriers. When the DRU is derived from NLRU, the LRU is called as Distributed Logical Resource Unit (DLRU), and the LRU consists of 18 subcarriers. In IEEE 80216m systems, the DLRU contains a group of paired subcarriers spread across the distributed resources within a frequency partition. The minimum unit for forming the DLRU is equal to a pair of subcarriers, called tone-pair.

FIGS. 4 and 5 illustrate examples of RB or PRU structure used in downlink of the IEEE 802.16m standards. In every PRU, certain subcarriers are reserved for pilot tones and the pilot tones used for estimating the channel between the transmitter and receiver. In OFDMA systems, the localized and distributed sub-channelization methods provide a great flexibility in reaping the benefits of both single user and multi-user diversity.

The advanced air interface basic frame structure is illustrated in FIG. 3. Each 20 ms superframe is divided into four equally-sized 5 ms radio frames. When using the channel bandwidth of 5 MHz, 10 MHz, or 20 MHz, each 5 ms radio frame further consists of eight Advanced Air Interface (AAI) subframes for G=⅛ and 1/16. For G=¼, the 5 ms radio frame consists of seven AAI subframes. With the channel bandwidth of 8.75 MHz, the 5 ms radio frame consists of seven AAI subframes for G=⅛ and 1/16, and six AAI subframes for G=¼. With the channel bandwidth of 7 MHz, the 5 ms radio frame consists of six AAI subframes for G=1/16, and five AAI subframes for G=⅛ and G=¼. An AAI subframe shall be assigned for either DL or UL transmission.

There are four types of AAI subframes:
1) type-1 AAI subframe which consists of six OFDMA symbols,
2) type-2 AAI subframe which consists of seven OFDMA symbols,
3) type-3 AAI subframe which consists of five OFDMA symbols, and
4) type-4 AAI subframe which consists of nine OFDMA symbols. This type shall be applied only to an UL AAI subframe for the 8.75 MHz channel bandwidth when supporting the Wireless MAN-OFDMA frames. The size of Q depends on the AAI subframe types as mentioned above.

The basic frame structure is applied to FDD and TDD duplexing schemes, including H-FDD AMS operation. The number of switching points in each radio frame in TDD systems shall be two, where a switching point is defined as a change of directionality, i.e., from DL to UL or from UL to DL. When H-FDD AMSs are included in an FDD system, the frame structure from the point of view of the H-FDD AMS is similar to the TDD frame structure. However, the DL and UL transmissions occur in two separate frequency bands. The transmission gaps between DL and UL and between UL and DL are required to allow switching the TX and RX circuitry.

A data burst shall occupy either one AAI subframe (i.e. the default TTI transmission) or contiguous multiple AAI subframes (i.e. the long TTI transmission). Any 2 long TTI bursts allocated to an AMS shall not be partially overlapped, i.e. any 2 long TTI bursts in FDD shall either be over the same 4 subframes or without any overlap. The long TTI in FDD shall be 4 AAI subframes for both DL and UL. For DL (UL), the long TTI in TDD shall be all DL (UL) AAI subframes in a frame.

The transmission of predefined (known) sequences on the pilot subcarriers in the downlink is necessary for enabling channel estimation, measurements of channel quality indicators (CQI) such as the SINR, frequency offset estimation, etc. To optimize the system performance in different propagation environments and applications, AAI of IEEE 802.16m supports both common and dedicated pilot structures. The categorization in common and dedicated pilots is done with respect to the usage of common and dedicated pilots. The common pilots can be used by all MSs and the pilots are precoded in the same way as the data subcarriers within the same PRU. Dedicated pilots can be used with both localized and distributed allocations. The dedicated pilots are associated with a specific resource allocation and are intended to be used by the MSs allocated to said specific resource allocation. Therefore dedicated pilots shall be precoded or beamformed in the same way as the data subcarriers of the resource allocation. The pilot structure is defined for up to eight transmission (Tx) streams and there is a unified pilot pattern design for common and dedicated pilots. There is equal pilot density per Tx stream, while there is not necessarily equal pilot density per OFDMA symbol of the downlink AAI subframe. Further, within the same AAI subframe there is equal number of pilots for each PRU of a data burst assigned to one MS. Pilot patterns are specified within a PRU. The base pilot patterns used for two DL data streams in dedicated and common pilot scenarios are shown in FIG. 4, with the subcarrier index increasing from top to bottom and the OFDM symbol index increasing from left to right. Subfigure (a) and Subfigure (b) in FIG. 4 shows the pilot location for pilot stream 1 and pilot stream 2 in a PRU, respectively. The number on a pilot subcarrier indicates the pilot stream the pilot subcarrier corresponds to. The subcarriers marked as 'X' are null sub-carriers, on which no pilot or data is transmitted. The interlaced pilot patterns are generated by cyclic shifting of the base pilot patterns. The interlaced pilot patterns are used by different BSs for one and two streams. Interlaced pilot patterns for one stream is shown in FIG. 5 and interlaced pilot patterns on stream 1 and stream 2 for two streams are shown in FIG. 6 and FIG. 7, respectively. Each BS chooses one of the three pilot pattern sets (pilot pattern set 0, 1, and 2) as shown in FIG. 5, FIG. 6 and FIG. 7. The index of the pilot pattern set used by a particular BS with Cell ID=k is denoted by $p_k$. The index of the pilot pattern set is determined by the Cell ID according to the following equation: $p_k$=floor (k/256).

For one stream, each ABS additionally chooses one of the two stream sets (stream set 0 and 1) within each pilot pattern set. The index of the stream, denoted by $s_k$, shall be determined according to the following equation: $s_k$=mod (k, 2). For the AAI subframe consisting of 5 symbols, the last OFDM symbol in each pilot pattern set shown in FIG. 4 is deleted. For the AAI subframe consisting of 7 symbols, the first OFDM symbol in each pilot pattern set shown in FIG. 4 is added as 7th symbol.

Communication between the BS and the MS and vice-versa requires spectrum. Spectrum is a very scarce resource, and the spectrum further limited due to pre-occupation of some portion of the bands for other applications such as defense and space in some countries. The available spectrum will be reused in every cells/sectors. Since same frequency band (bandwidth) is reused in different cells/sectors depending on the reuse factor, the subscriber at the boundary between regions will be severely affected by interference. This phenomenon is called as co-channel interference (CCI), and the performance for the subscriber in these cell edge regions is severely affected by the CCI. This predominantly limits the cell edge throughput, and hence brings down the overall system throughput. The problem is even worse in the case of the emerging broadband wireless technologies such as IEEE 802.16m, LTE and LTE-Advanced, where the available frequency resource is expected to be used in a frequency reuse 1 fashion in every sector in order to meet the high data rate requirements of the subscribers. Therefore, the major challenge in developing the above mentioned emerging broadband wireless technologies is to mitigate interference.

Interference can be mitigated using simple receiver processing techniques like interference suppression minimum mean square error (MMSE) receivers. There is another interference mitigation technique called conjugate data repetition (CDR), where a transmission scheme repeats data in a predefined fashion across cells/sectors relying on multiple copies of the transmitted signal, multiple receive antennas, and MMSE receivers. The techniques can be employed to suppress interference, and thereby improve the reliability as well as throughput for cell edge users.

One of the major challenges in the design of interference suppression MMSE receiver is to obtain a good quality estimation of the desired fading channel and the 'interference plus noise' covariance matrix. The reference signals or pilots are transmitted by the base station (BS) or by the MS for the purpose of channel estimation, and also for the interference plus noise covariance estimation. In the interference limited scenario, because of the frequency reuse, these reference signal or pilots will also be affected by severe CCI. This in turn affects the quality of channel estimates and interference covariance estimates, which in turn affect the throughput of the cell edge users.

Consider a cellular layout with 3 sectors cells as shown in FIG. 1. In general, the strongest interference for a cell edge user comes from those sectors with sector numbers different from its desired one. For example in FIG. 1, the user with sector number 0 receives the strongest interference from those surrounding sectors with sector numbers 1 and 2.

The SINR seen by the pilot symbols can be improved by avoiding pilot to pilot collisions between sectors with different sector numbers using interlaced pilots. Each sector number is assigned a pilot pattern, in a set of locations in the 2-dimensional frequency-time grid within a PRU, which does not collide with those used by other sectors with different sector number. For example in IEEE802.16m, pilot pattern used by sector 0 is shown in FIG. 4. The Sector 1 and Sector 2 use cyclically shifted version of the pilot pattern used by sector 0 as shown in FIGS. 5, 6 and 7. The SINR seen by the pilot symbols can also be improved by boosting the power of pilot tones with respect to data tones. The pilot tones receive interference from the data tones of the neighboring sectors. The pilot boosting helps to improve the received signal-to-interference-plus-noise-ratio (SINR) of the pilot tones.

The pilot tones are boosted at the expense of data tone's power. The power on data tones has to be reduced to keep the total transmitted power the same. This reduces data SINR and results in higher error rate. The data tones transmitted at the locations corresponding to the pilot positions of the neighboring sectors see heavy interference resulting in data erasures. The interference covariance estimates measured from pilot tones are not accurate since the number of pilots within a PRU is small to get enough averaging. Moreover, the interference covariance of those data tones interfered by pilot tones are different from those interfered by data tones. The interference suppression receivers may not work efficiently with the conventional techniques.

Another aspect affecting the reliability of CQI (for example the post-processing MMSE SINR estimates) measurement is the multi-antenna precoder used at the transmitter. When the desired signal as well as interfering signals employ multiple antennas for transmission, the signal as well as interference measured at the receiver become a function of the multi-antenna precoder employed at the respective transmitters which vary in frequency and time continuously based on the feedback from the respective receivers. In systems employing closed-loop precoded transmission, the CQI changes from time to time. This change in CQI causes the multi-user scheduler to allocate incorrect modulation and coding rate (MCS) and therefore causes degradation in system capacity.

The IEEE 802.16m standard uses open-loop (OL) region in the downlink. The OL region is defined as a time-frequency resource using a given pilot pattern and a given open-loop MIMO mode without closed loop rank adaptation. The open-loop region allows base stations across different cells/sectors to coordinate their open-loop MIMO transmissions, in order to offer a stable interference environment where the precoders and numbers of streams are not time-varying. The resource units used for the open-loop region are indicated in a downlink broadcast message and the resource units shall be aligned across cells.

The DL OL region consists of a rank-1 OL MIMO region where only a single data stream is transmitted across multiple antennas and uses single stream rank-1 OL precoding. The precoder is kept constant for the duration of the resource block (RB) or groups of RBs and the precoder may change from one (or group of) resource block to another. In OL region, the precoder that is used in each RB is pre-defined. Data and pilots in each RB are precoded using the same precoder.

SUMMARY

An object of this invention is to propose a simple way of reducing interference at pilot symbols, enable good interference measurements, enable efficient interference suppression receivers, accurate channel quality information (CQI) estimation based on post-processed SINR and enable accurate and efficient multi-user scheduling for CDR and non-CDR modes operating in rank-1 OL region. However, this invention is not limited to the rank-1 OL region.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 15 illustrates COFIP pilot locations and pilot pattern assignments for pilot pattern set 0 for AAS subframe with 6 OFDM symbols, according to an embodiment herein;

FIG. 16 illustrates COFIP pilot locations and pilot pattern assignments for pilot pattern set 1 for AAS subframe with 6 OFDM symbols, according to an embodiment herein;

FIG. 17 illustrates COFIP pilot locations and pilot pattern assignments for pilot pattern set 2 for AAS subframe with 6 OFDM symbols, according to an embodiment herein;

DETAILED DESCRIPTION OF EMBODIMENTS

Figure 1:
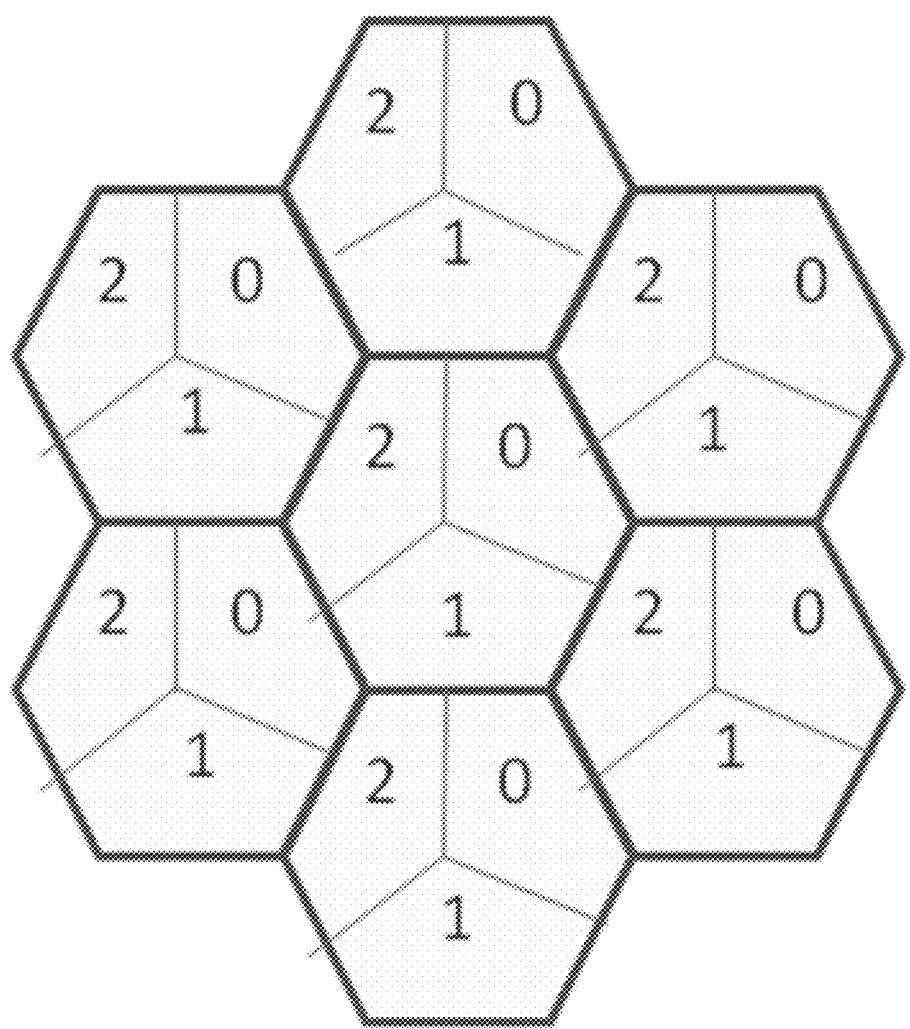
FIG. 1 illustrates a cellular layout with 3 sector cells, according to an embodiment herein.
Figure 2:
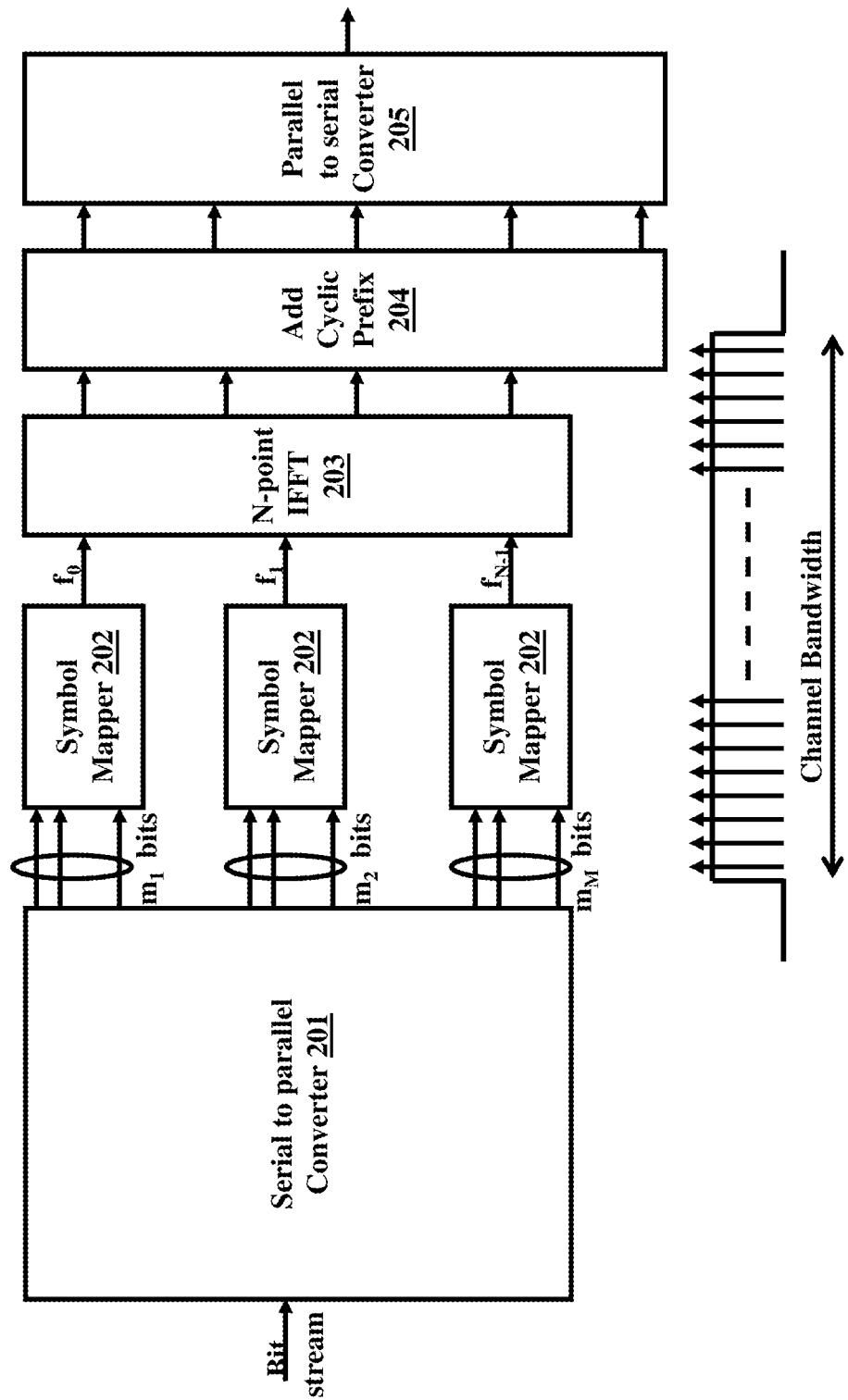
FIG. 2 illustrates a block diagram of an OFDMA based system, according to an embodiment herein.
Figure 3:
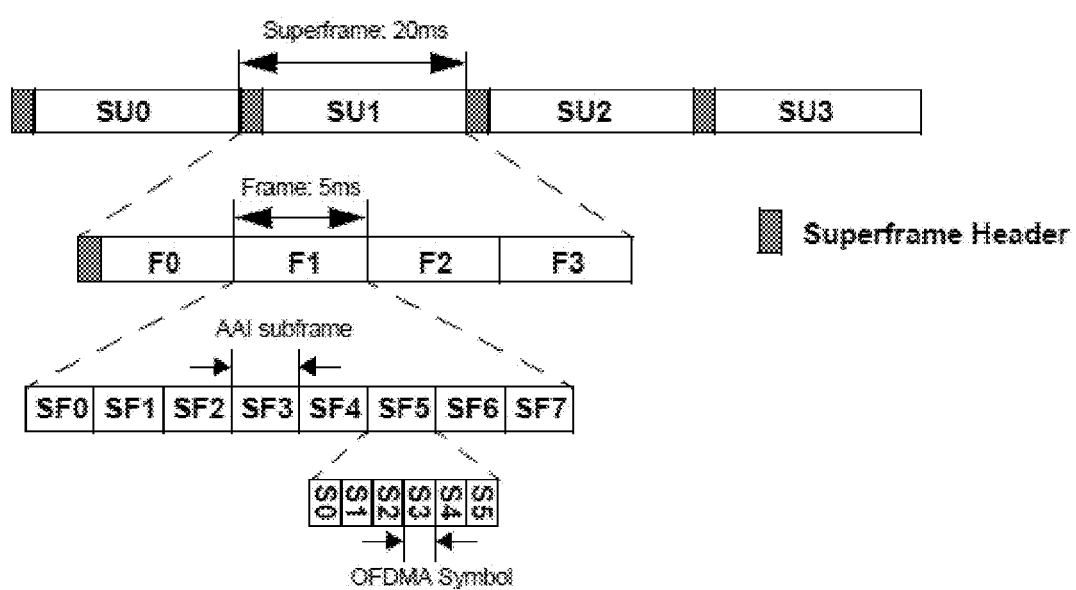
FIG. 3 illustrates the basic frame structure for 5, 10 and 20 MHz channel bandwidths, according to an embodiment herein.
Figure 4:
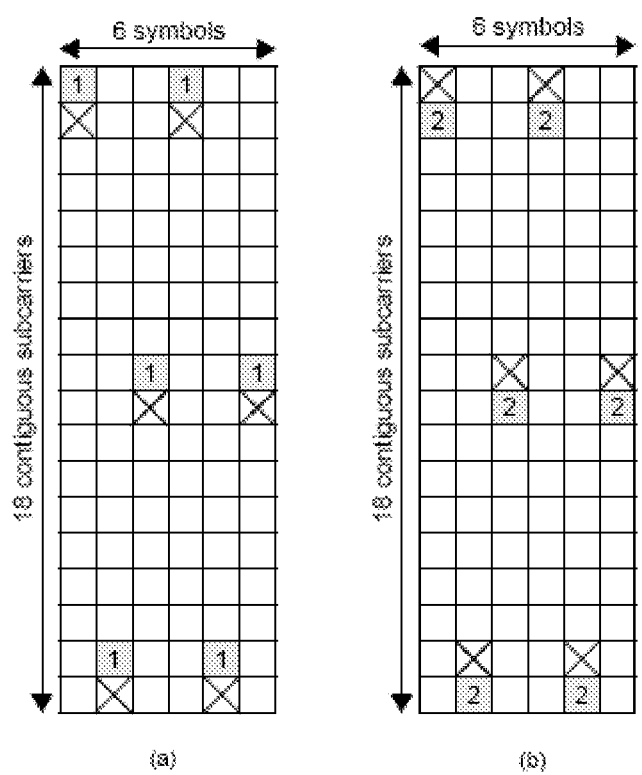
FIG. 4 illustrates pilot patterns used for 2 DL data streams, according to an embodiment herein.
Figure 5:
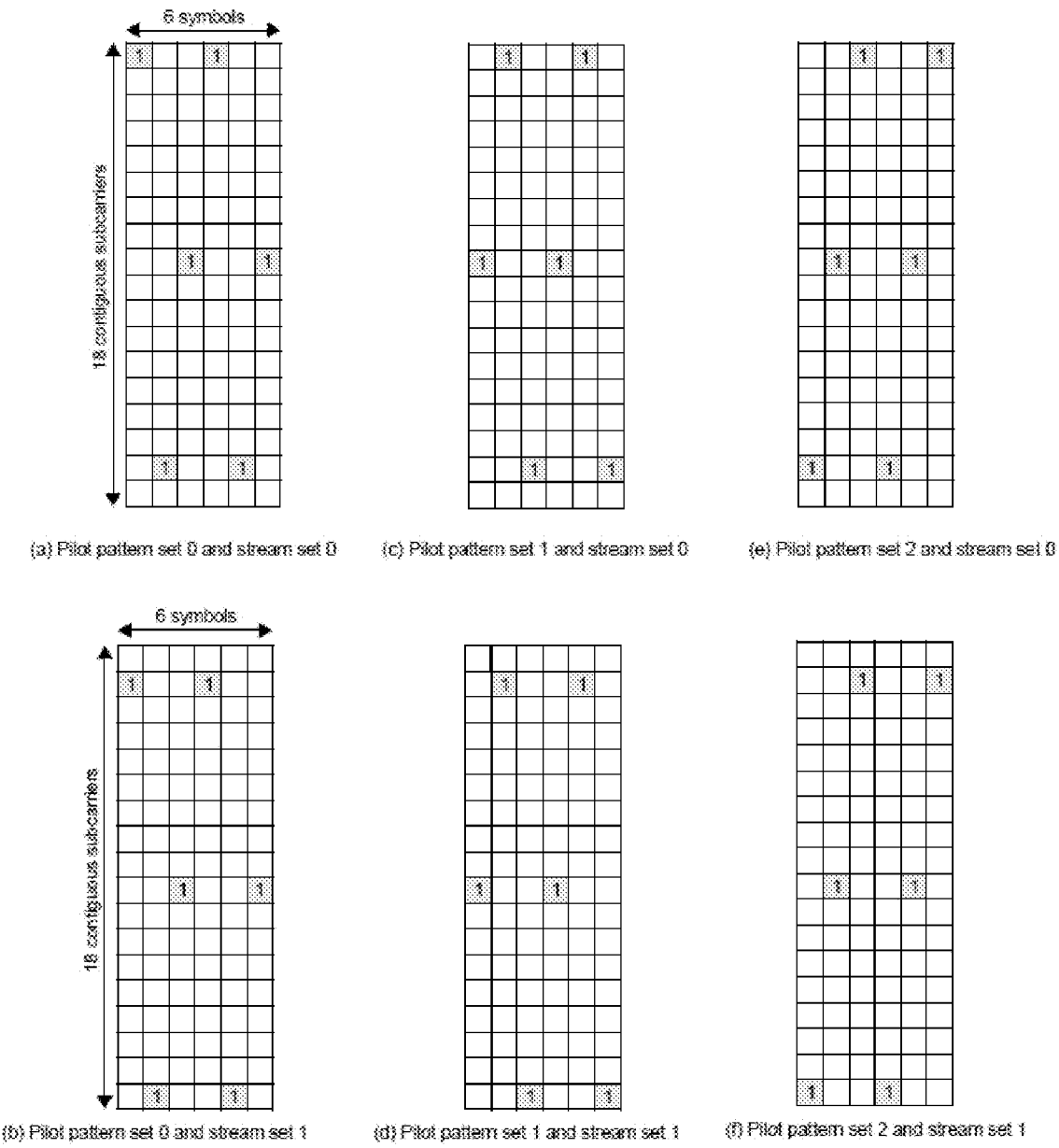
FIG. 5 illustrates interlaced pilot patterns for 1 data stream outside the open-loop region, according to an embodiment herein.
Figure 6:
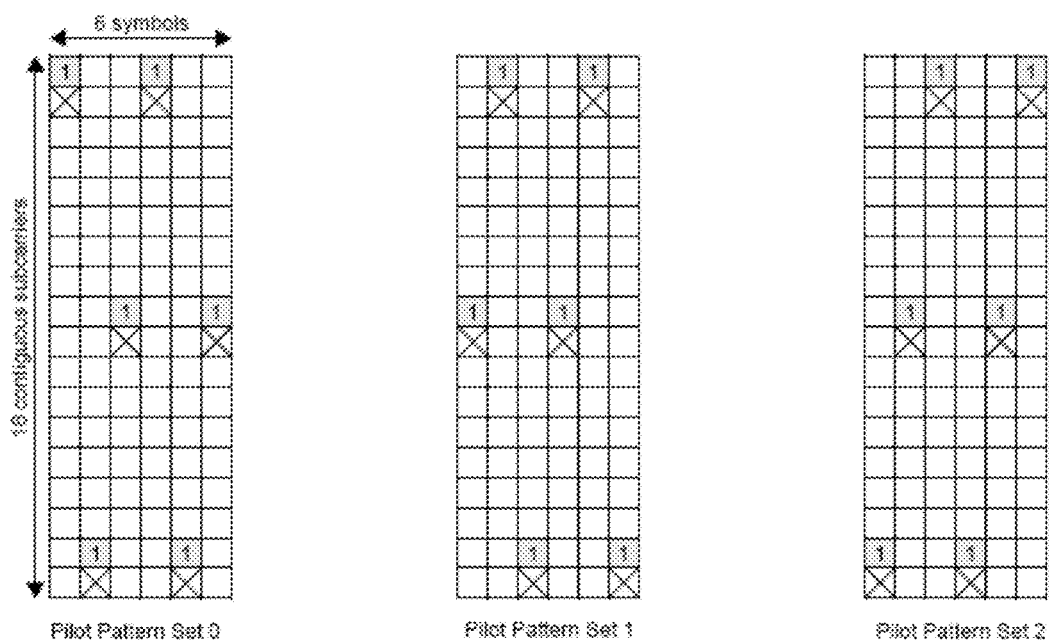
FIG. 6 illustrates interlaced pilot patterns on stream 0 for 2 data streams, according to an embodiment herein.
Figure 7:
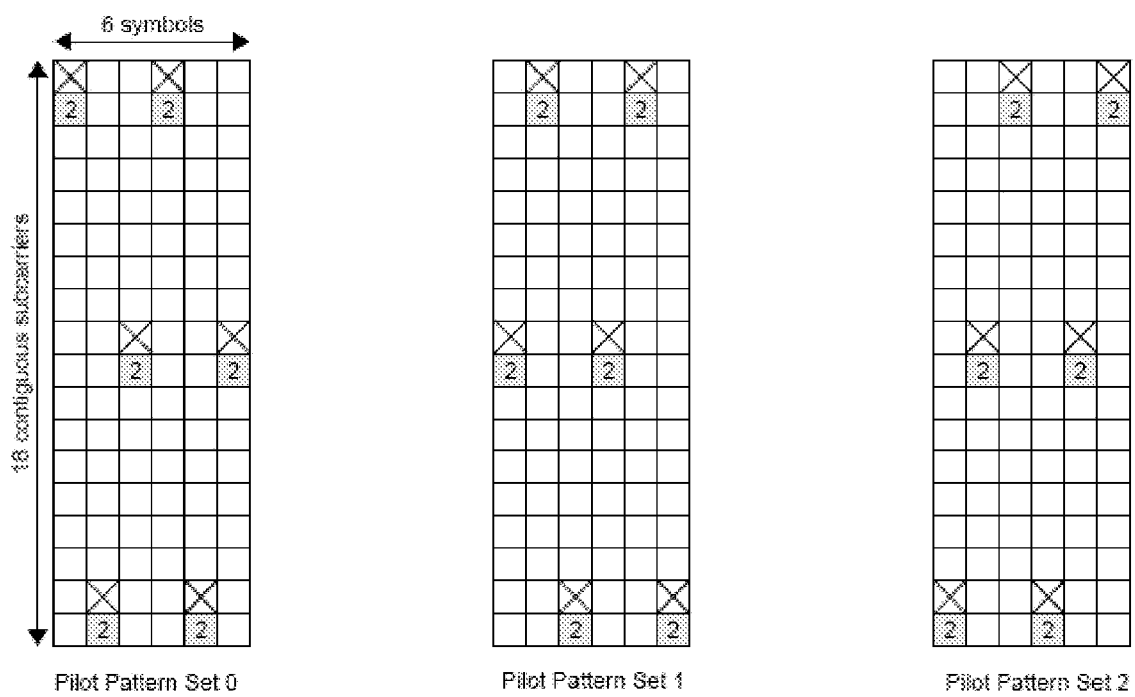
FIG. 7 illustrates interlaced pilot patterns on stream 1 for 2 data streams, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a method for reducing interference at pilot symbols and also enable good interference measurements, enable efficient interference suppression receivers, accurate channel quality information (CQI) estimation based on post-processed SINR, and as a result enable accurate and efficient multi-user scheduling for CDR and non-CDR modes operating in rank-1 OL region. However, this invention is not limited to the rank-1 OL region. Referring now to the drawings, and more particularly to FIGS. 1 through 33, where similar reference characters denote corresponding features consistently throughout the figures, there are shown preferred embodiments.

Embodiments herein propose a way of reducing interference at pilot symbols and also enable good interference measurements. The pilot design is based on the following design criteria:

1) Clusters of N sectors are numbered from 0 to N−1 called as sector numbers. The N sectors can be derived from the cell/sector ID or BS ID using modulo N operations, or by some other means. Where N can be any integer.

2) Each sector with a given sector number is assigned a pilot pattern. The pilot pattern assigned to each sector avoids pilot on pilot collisions during pilot tone transmissions with any other sector having a different sector number.

3) A Sector with a given sector number avoids interference, to the pilots of other sectors with a different sector number, by not transmitting data or pilots at those locations corresponding to their pilot pattern.

Essentially, a system with "N" transmitters is considered. When a given transmitter transmits a pilot signal over a pre-defined time-frequency resource, all other transmitters remains silent. The receivers can estimate the channel state information without any interference from the remaining N−1 transmitters and at the same time the receiver can measure either the individual interference channel states or the interference covariances from the N−1 silent periods. The groups of "N" transmitters are reused in geographically separated region using a frequency reuse structure. In another embodiment, the pilot signal is precoded using a multi-antenna precoder. The precoder is preferably the same for pilot and data.

Figure 8:
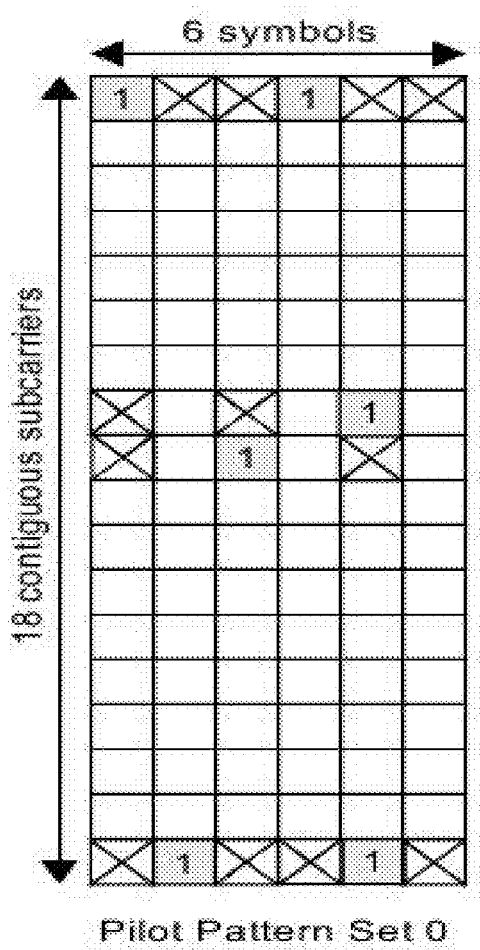
FIG. 8 illustrates COFIP pilot structure for pilot pattern set 0 for AAS subframe with 6 OFDM symbols, according to an embodiment herein.
Figure 9:
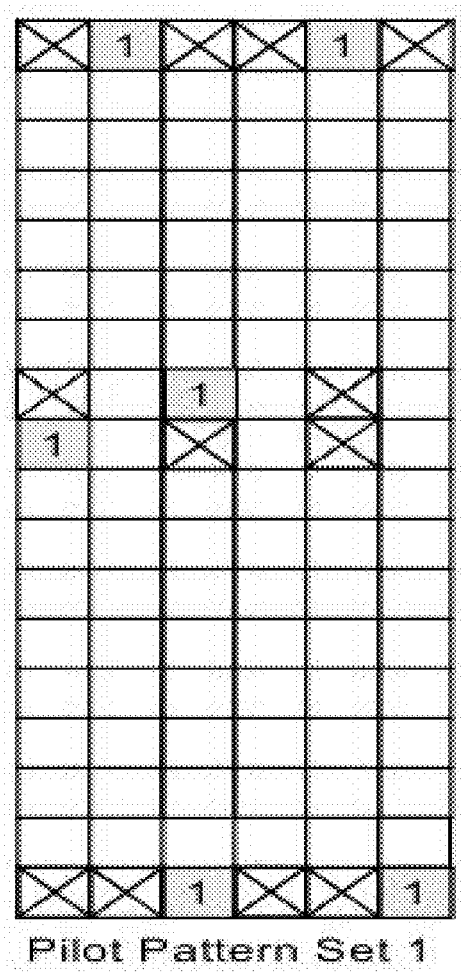
FIG. 9 illustrates COFIP pilot structure for pilot pattern set 1 for AAS subframe with 6 OFDM symbols, according to an embodiment herein.
Figure 10:
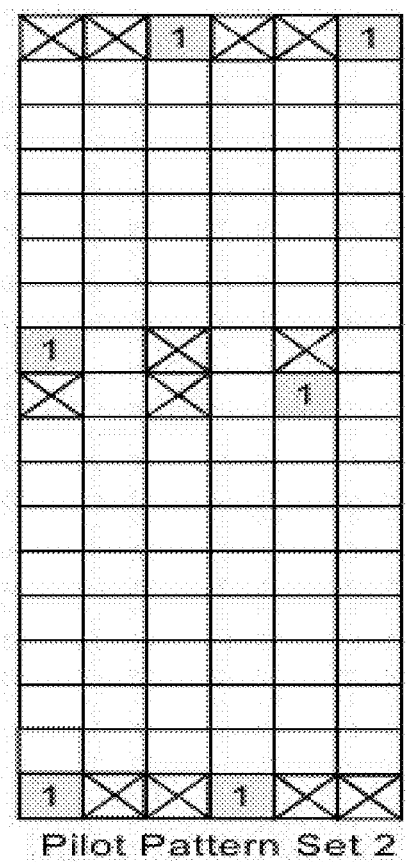
FIG. 10 illustrates COFIP pilot structure for pilot pattern set 2 for AAS subframe with 6 OFDM symbols, according to an embodiment herein.

In an embodiment if N=3, a predetermined set of PRUs may transmit null tones in the pilot locations of BSs having a Cell_ID different from the BS of the PRU. Null tones are introduced in the 1-stream interlaced pilot pattern as shown in FIGS. 8, 9 and 10. The index of the COFIP type used by a particular BS with Cell_ID=k is denoted by $p_k$. The index of the COFIP type is determined by the Cell_ID according to the following equation: $p_k$=mod (k, N). The cell ID of the sectors in the same cell are contiguous numbers and there are three sectors per cell, and standard reuse ⅓ sector planning is assumed. In another embodiment, the index of the COFIP type can be determined by the Cell_ID according to the following equation: $p_k$=floor (k/256). In this embodiment the cell IDs of the sectors in the same cell have a separation of 256, for e.g., 0, 256 and 512 are the cell IDs of the sectors in the same cell, and standard reuse ⅓ planning is assumed.

In FIGS. 8, 9 and 10, 'P' denotes a pilot tone and 'X' denotes a null tone i.e., no data or pilot tone is transmitted in that location. Null tones reduce the interference level on the pilot locations. Null tones also facilitate measurements related to interference channels.

There is an even number of data tones in an OFDM symbol per Resource block (RB) (for example, 14 or 16). Sub-carrier pairs can be allocated in the 'frequency first' manner, complying with the 802.16m sub-carrier permutation. Each sub-carrier pair can contain SFBC ($[s_1(-s_2^*)s_2(s_1^*)]$), CDR ($[s_1 s_2^*]$), or non-CDR etc.

The 6 'pilots+null tones' in the $8^{th}$ and $9^{th}$ sub-carriers can be moved up, down or to the right, with a constraint of even number of sub-carriers in each symbol per RB. Let (x, y) be the location of a pilot/null tone, where x is the symbol and y is the sub-carrier indices. The locations of 6 pilots/null tones in the $8^{th}$ and $9^{th}$ sub-carriers are (1,8), (1,9), (3,8), (3,9), (5,8) and (5,9).

Many variations in these pilot locations can be suggested in order to optimize the channel estimation at different time and frequency selectivity factors. The possible variations in the locations of pilot/null tones can be represented as: $(1+\delta_t, 8+\delta_{f1})$, $(1+\delta_t, 9+\delta_{f2})$, $(3+\delta_t, 8+\delta_{f3})$, $(3+\delta_t, 9+\delta_{f4})$, $(5+\delta_t, 8+\delta_{f5})$, $(5+\delta_t, 9+\delta_{f6})$, where, $\delta_t \in \{0, 1\}$ and $\delta_f \in \{-3, -2, -1, 0, 1, 2, 3\}$.

Figure 11:
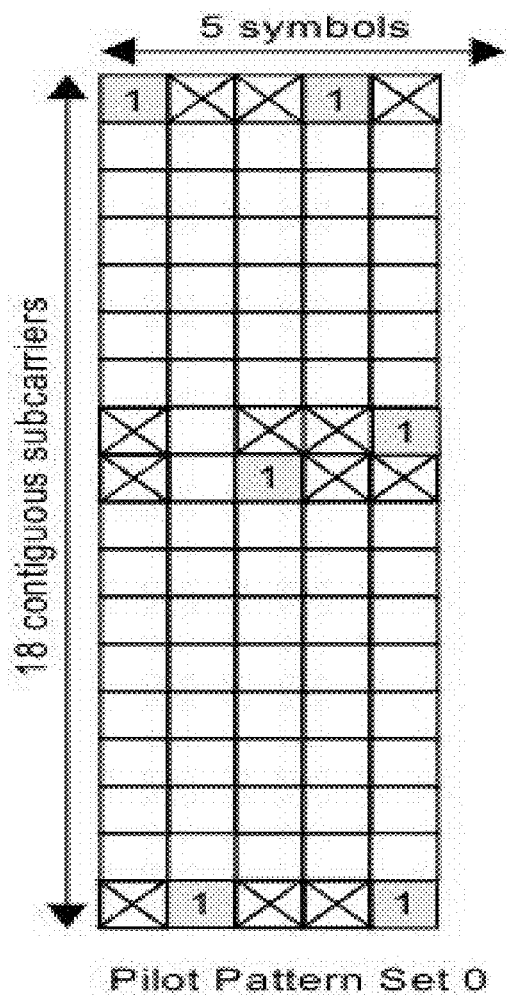
FIG. 11 illustrates COFIP pilot structure for pilot pattern set 0 for AAS subframe with 5 OFDM symbols, according to an embodiment herein FIG. 12 COFIP illustrates pilot structure for pilot pattern set 1 for AAS subframe with 5 OFDM symbols, according to an embodiment herein
Figure 12:
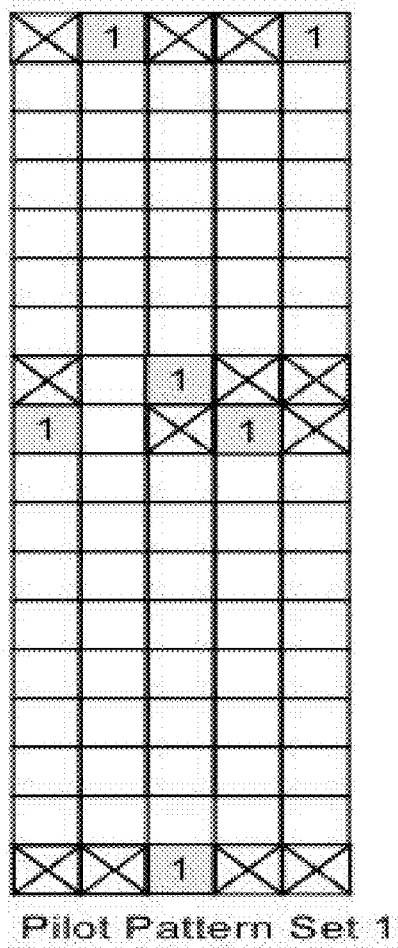
Figure 13:
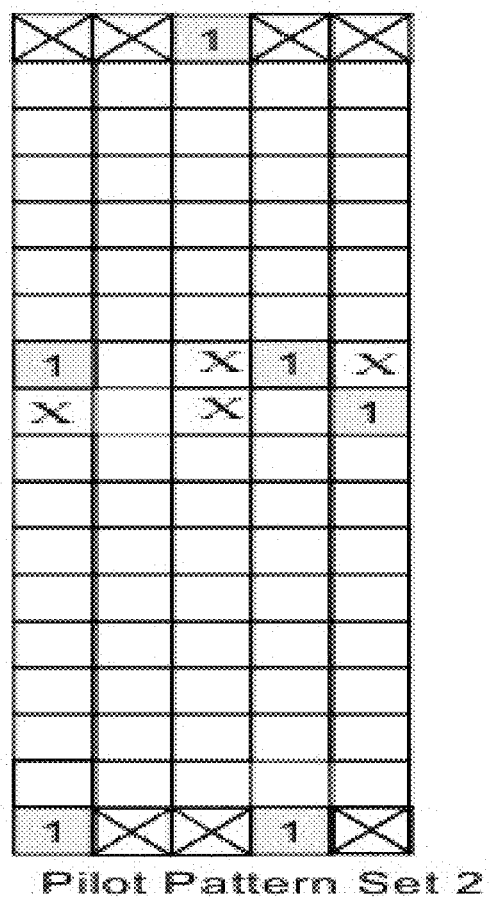
FIG. 13 illustrates COFIP pilot structure for pilot pattern set 2 for AAS subframe with 5 OFDM symbols, according to an embodiment herein.

For the sub-frame consisting of 5 symbols, the last OFDM symbol in each pilot pattern set shown in FIG. 8, 9, 10 can be deleted to form the new pattern. In another embodiment, the last OFDM symbol in each pilot pattern set shown in FIGS. 8, 9 and 10 are deleted and the pilot/null tones are moved inside as shown in FIGS. 11, 12 and 13.

For the sub-frame consisting of 7 symbols, the first OFDM symbol in each pilot pattern set shown in FIGS. 8, 9 and 10 is added as 7th symbol. In another embodiment, a pilotless OFDM symbol are added to the pattern set shown in FIGS. 8, 9 and 10, as $7^{th}$ symbol.

Figure 14:
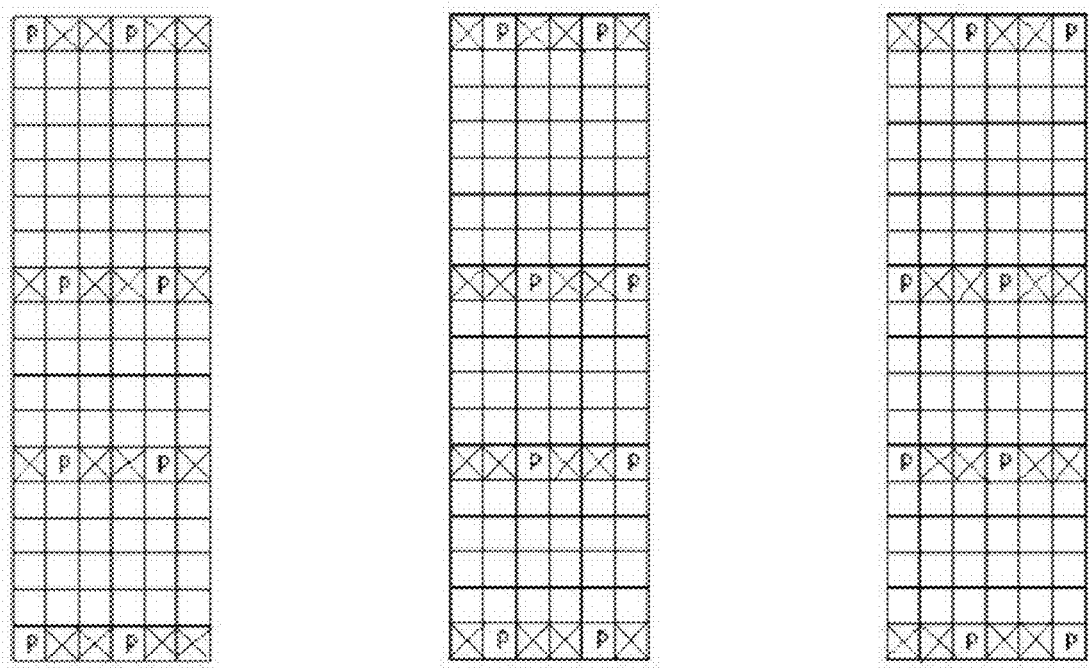
FIG. 14 illustrates COFIP patterns with 8 pilots, according to an embodiment herein.
Figure 18:
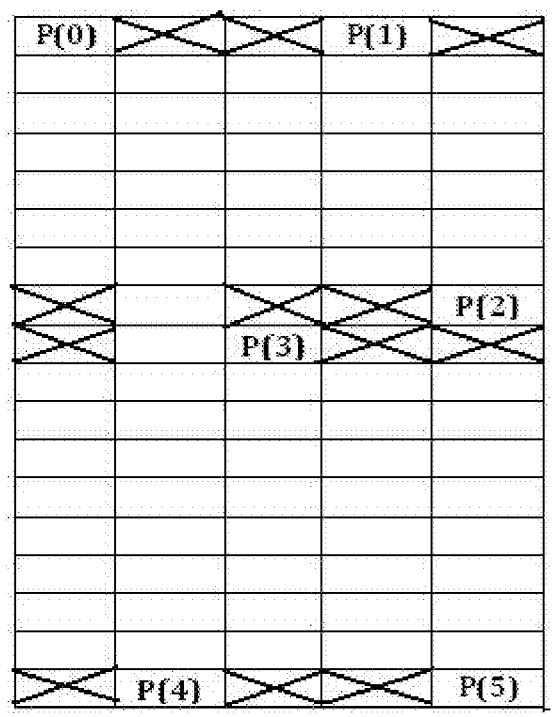
FIG. 18 illustrates COFIP pilot locations and pilot pattern assignments for pilot pattern set 0 for AAS subframe with 5 OFDM symbols, according to an embodiment herein.
Figure 19:
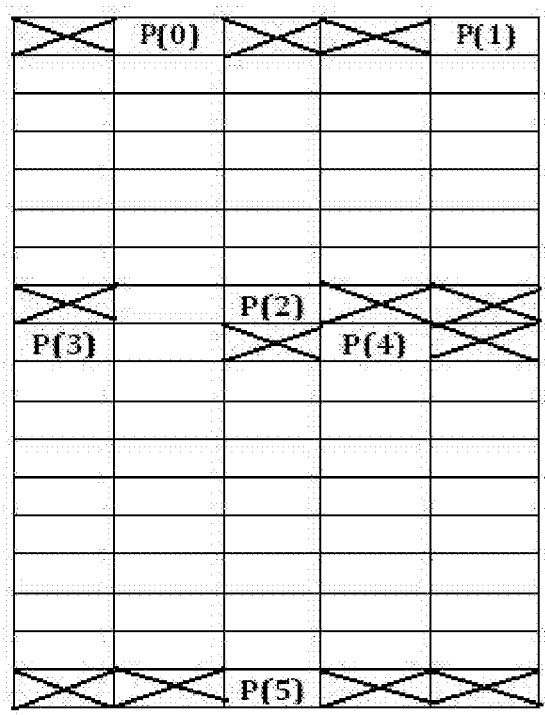
FIG. 19 illustrates COFIP pilot locations and pilot pattern assignments for pilot pattern set 1 for AAS subframe with 5 OFDM symbols, according to an embodiment herein.
Figure 20:
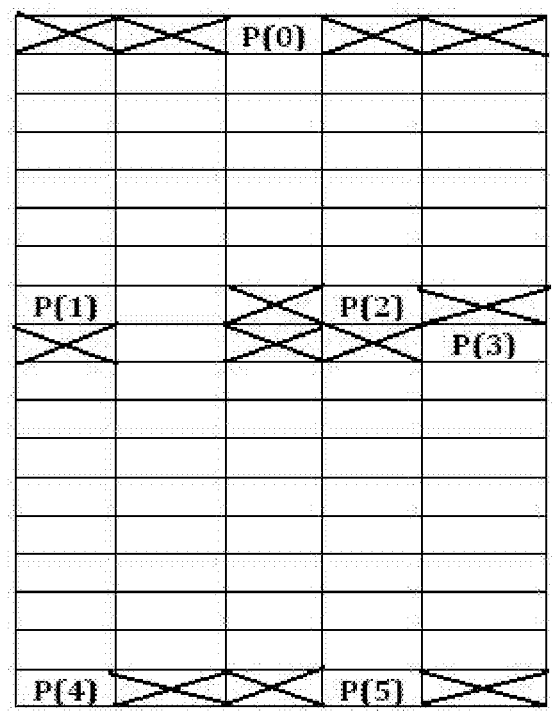
FIG. 20 illustrates COFIP pilot locations and pilot pattern assignments for pilot pattern set 2 for AAS subframe with 5 OFDM symbols, according to an embodiment herein.
Figure 21:
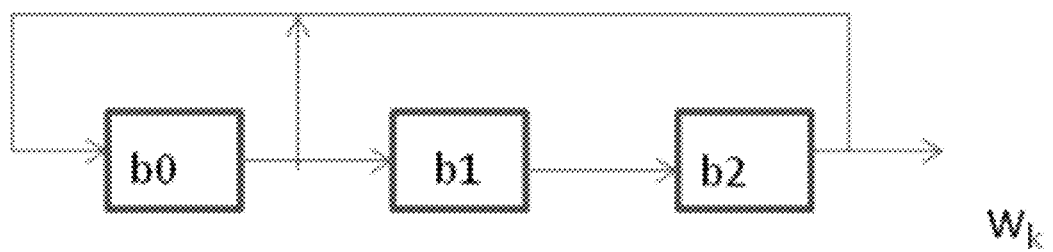
FIG. 21 illustrates a PRBS Generator with polynomial $X^3+X+1$, according to an embodiment herein.

Other variation of COFIP is obtained by keeping the number of data tones in an OFDM symbol per Resource block (RB) of size 18×6 an even number (e.g. could be 14 or 16 or 18), and the number of pilot tones could be four or six or eight. The COFIP pattern for 18×5 and 18×7 is obtained from the 18×6 COFIP pattern by deleting any one column and adding any one column, respectively. In FIG. 14, an alternative COFIP structure which contains 8 pilot tones in each PRU is shown. In FIG. 14, the pilots and null tones in a given row can be shifted up or down to generate other variations.

Embodiments herein facilitate different reuse pattern for pilots and data. In OFDMA systems, although pilots and data tones are transmitted in the same PRU, pilot tones can use reuse 1/M1 and data can use reuse 1/M2. In another embodiment, pilots uses reuse ⅓ and data uses reuse 1. In yet another embodiment, pilots can use reuse factors ¼ or ⅕ or ⅙ or 1/7 or 1/12. With lower reuse, quality of channel and covariance estimates approach near ideal values. For example, quality of channel and covariance estimates approach "n". The interference to the pilot tones from the data tones of the other sectors is completely avoided. A sector transmits null tone at the tone locations corresponding to the pilot pattern assigned to other sectors having different sector number. The method has two key advantages.

1) The pilot tones are almost interference free except weak interference from the pilot tones transmitted by those sectors with same sector number. The improved SINR at the pilot tones improve the accuracy of channel estimates 2) The tone locations corresponding to the pilot pattern assigned to other sector numbers may be used to get accurate interference covariance estimates or channel estimates of dominant interferers as well as residual interference covariance at those frequency locations. This information can be used either to construct the interference covariance explicitly, or use a demodulator that jointly detects the signal and dominant interferers while pre-whitening the residual interference.

The structure can be used in both UL and DL. The structure is particularly useful in OFDMA based standards for improving channel estimation and interference suppression.

Figure 24:
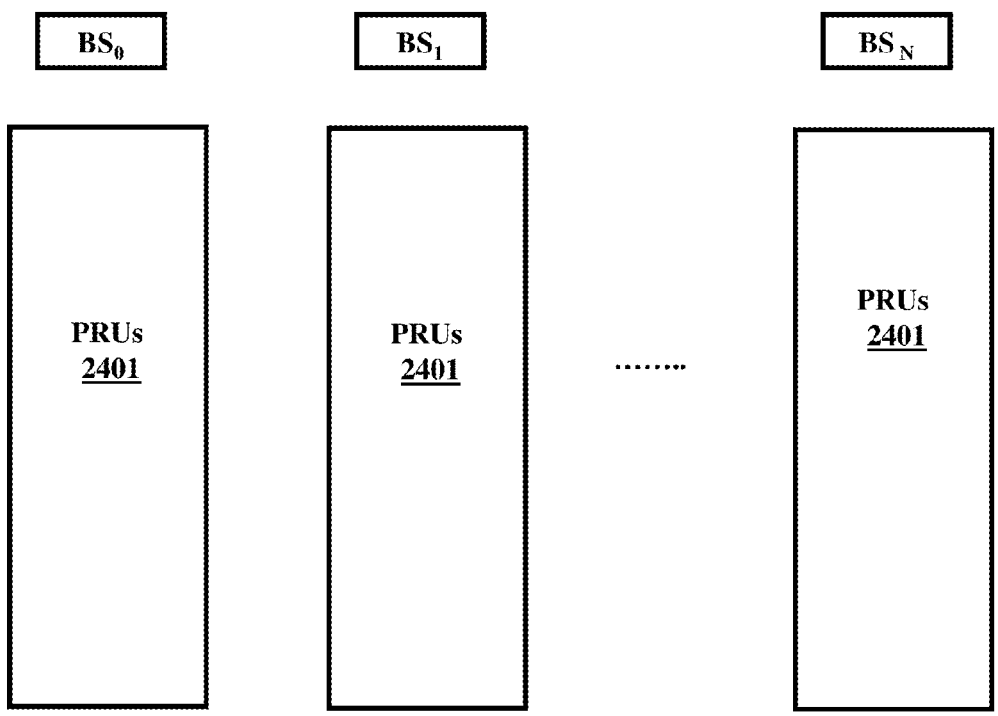
FIG. 24 illustrates CDR region, according to an embodiment herein.

CDR feature can be implemented in OFDMA networks in a rank-1 OL CDR region allocated to serve cell edge users and/or control channel transmission. The network assigns a pre-defined rank-1 OL region used for CDR encoding either in DL or UL. CDR region may be composed of a predefined set of resource units (e.g., a predefined set of either PRUs, or slots, or tiles be reserved for CDR) in each BS in the network. FIG. 24 illustrates the CDR region. Information about CDR region may be communicated to each MS in a broadcast control channel.

In rank-1 OL CDR region, the data and its complex conjugate are mapped to a pair of subcarriers within a basic CDR resource unit. The basic CDR resource unit may be composed of one or several PRUs 2401/RBs/tiles and the PRUs 2401/RBs/tiles may be contiguous or distributed in time-frequency plane. Mapping of complex and complex conjugate copies of data on to any two subcarriers is denoted as CDR encoding operation. The same type of CDR encoding is applied synchronously in all BSs in the CDR region. When the desired signal is transmitted in symbol pairs as [D, D*] on any two subcarriers, the same CDR encoding operation is performed on the same pair of subcarriers in all BSs (or sectors) while transmitting the data. CDR feature can be implemented either in DL or UL or both in DL and UL independently. When CDR is implemented in UL, all users in the network allocated in the CDR region use the same CDR encoding operation.

Figure 25:
FIG. 25 illustrates CDR encoding within a PRU, according to an embodiment herein.

In FIG. 25 the basic CDR resource unit is one PRU and the complex and complex conjugate data pair denoted as [D, D*] is mapped to any two subcarriers within that PRU. Certain subcarriers are reserved for pilot tones. The pilot tones preferably use real-valued modulation such as binary phase shift keying (BPSK). BPSK pilots aid in interference covariance estimation. If pilots use complex modulation, the pilots are also transmitted in conjugate pairs to facilitate interference covariance estimation at the receiver.

Figure 26:
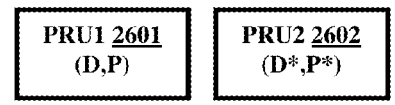
FIG. 26 illustrates CDR encoding using a pair of PRUs, according to an embodiment herein.
Figure 27:
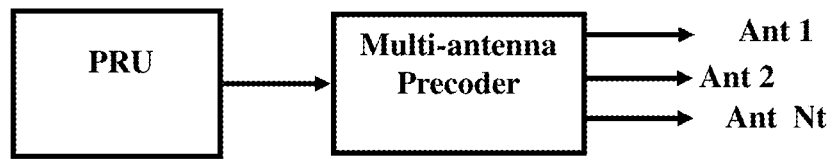
FIG. 27 illustrates multi-antenna precoding operation, according to an embodiment herein.
Figure 28:
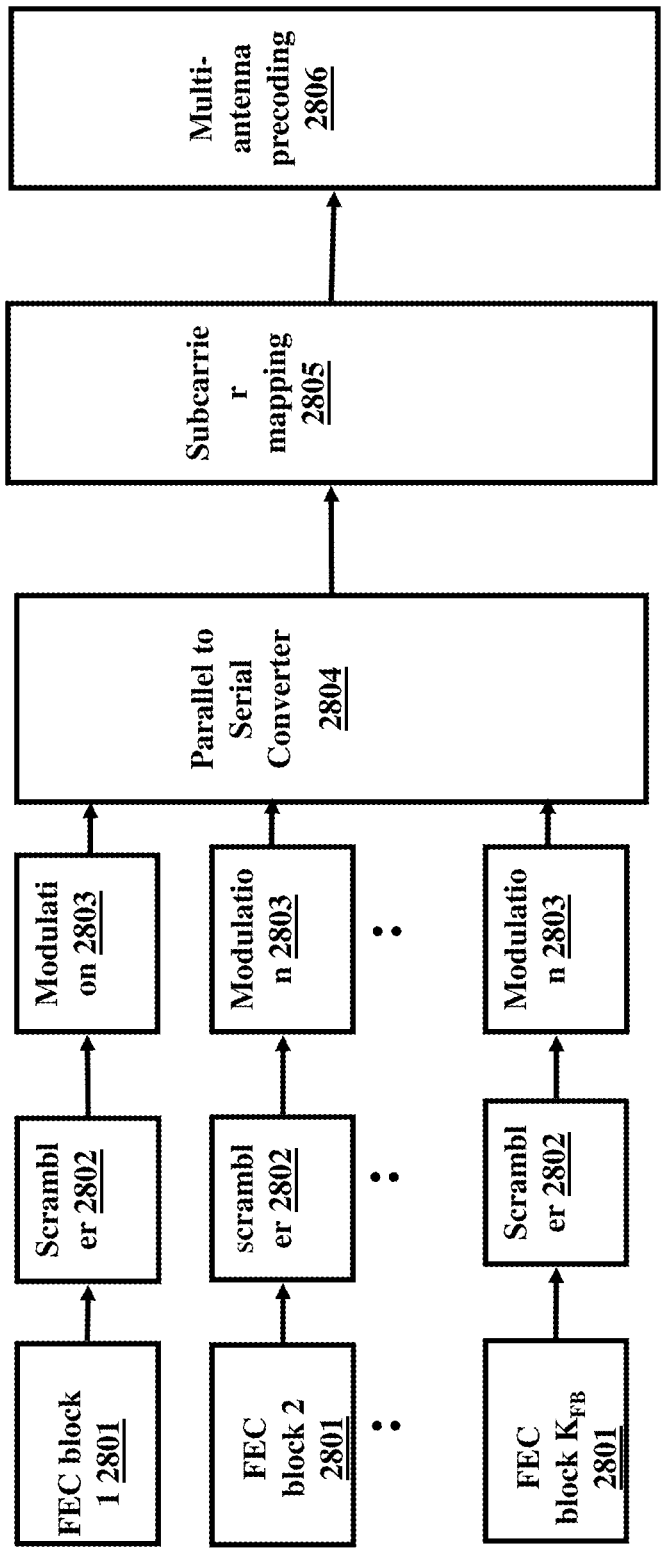
FIG. 28 illustrates baseband operations, according to an embodiment herein.

In FIG. 26 the basic CDR resource unit is a PRU pair and a set of data subcarriers are transmitted in the first PRU and the complex-conjugate copies of the data contained the first PRU1 2601 are transmitted in the second PRU2 2602. The first and second PRUs may be contiguous PRUs in time, or frequency. The first and second PRUs may also be distributed anywhere in the time-frequency grid. Pilot tones may also be transmitted in conjugate pairs. A first set of pilot tones are transmitted in the first PRU, and its complex-conjugated copy is transmitted in the second PRU.

In IEEE 802.16m where the DL uses OFDMA, the basic CDR resource unit may be chosen to be a single PRU composed of 18 subcarrier and 6 OFDM symbols, or the PRU may be composed of 18 subcarrier and 5 OFDM symbols, or the PRU may also be composed of 18 subcarrier and 7 OFDM symbols. In each PRU of the 16 m CDR region, the complex modulation symbol and its complex-conjugated copy are transmitted on a pair of subcarriers. The pair of subcarriers may be adjacent in time or frequency. Certain subcarriers are reserved for pilot tones. The pilot tones preferably use real-valued modulation such as binary phase shift keying (BPSK). BPSK pilots aid interference covariance estimation. If pilots use complex modulation, then the pilots are also transmitted in conjugate pairs to facilitate interference covariance estimation at the receiver. In an embodiment, CDR region uses Collision Free Interlaced Pilot (COFIP) pilot structure. In each PRU employing COFIP pilots, the data and its complex conjugate are mapped together in adjacent OFDM subcarriers. Data mapping avoids pilot and null tones.

In rank-1 OL CDR region, the receiver receives a CDR encoded desired signal and several CDR encoded interferers. After collecting the received signal from multiple subcarriers and performing the conjugation operation in those subcarriers used to send conjugated data, the signal received on each receiver antenna contains two copies of signal and interference data undergoing distinct channels. With Nr receiver antennas, the CDR encoded signal gives 2*Nr copies of the signal. A receiver processes the 2*Nr signal samples to reduce interference. In an embodiment, each of the 2*Nr received signal is filtered and combined to obtain a decision metric for demodulation. Filtering includes weighing of the received signal with a real/complex weight and summing up the weighted signals to obtain a decision metric for demodulation. The weights are obtained by minimizing the mean-square-error or by maximizing the post-processing SINR of the receiver. Computation of weights takes into account an estimate of the channel state information of the desired signal and covariance of the CDR encoded interference plus background noise. The filtered signal is used for demodulation of transmitted modulation data.

Figure 30:
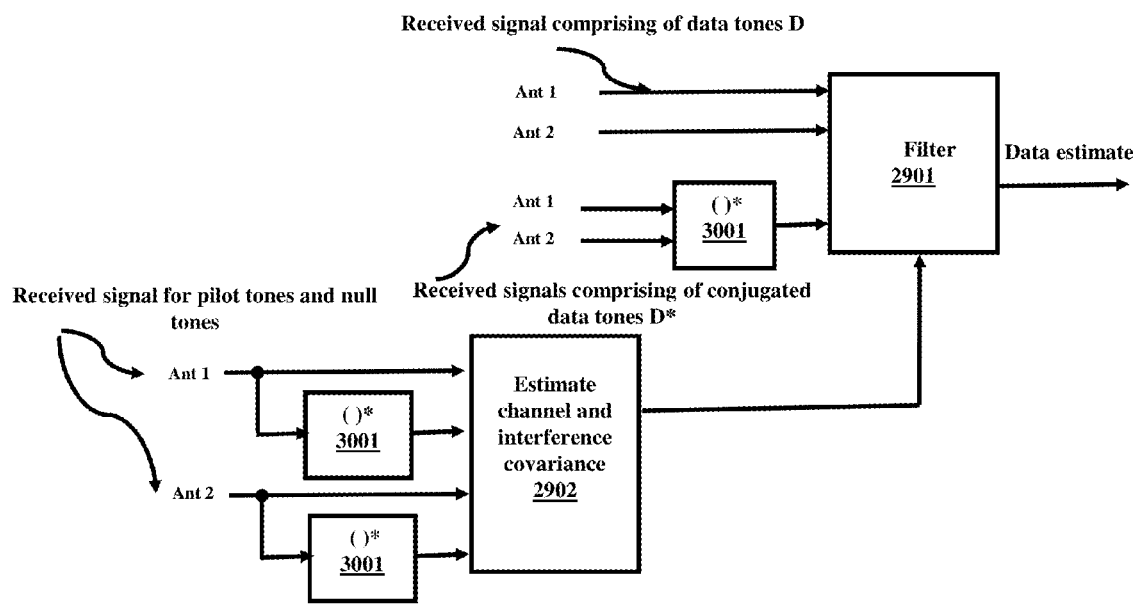
FIG. 30 illustrates a CDR multi-antenna receiver, according to an embodiment herein.

FIG. 30 illustrates the receiver structure for 2-receiver antenna case. In the figure the symbol ( )* 3001 denotes complex conjugation operation. FIG. 30 shows a CDR receiver structure when pilot tones are modulated by real-valued modulation such as BPSK. Since pilot tones use real-valued modulation, at each receiver antenna, collecting the complex valued received pilots, and the complex conjugate of the received pilot signal generates two distinct copies of signal and interference. Collecting the pilot samples from all receiver antennas provides 4 copies altogether. The pilot samples are used to estimate the channel state information and the covariance of the thermal noise plus total interference and the information is used to obtain the filter weights as well as CQI.

Figure 31:
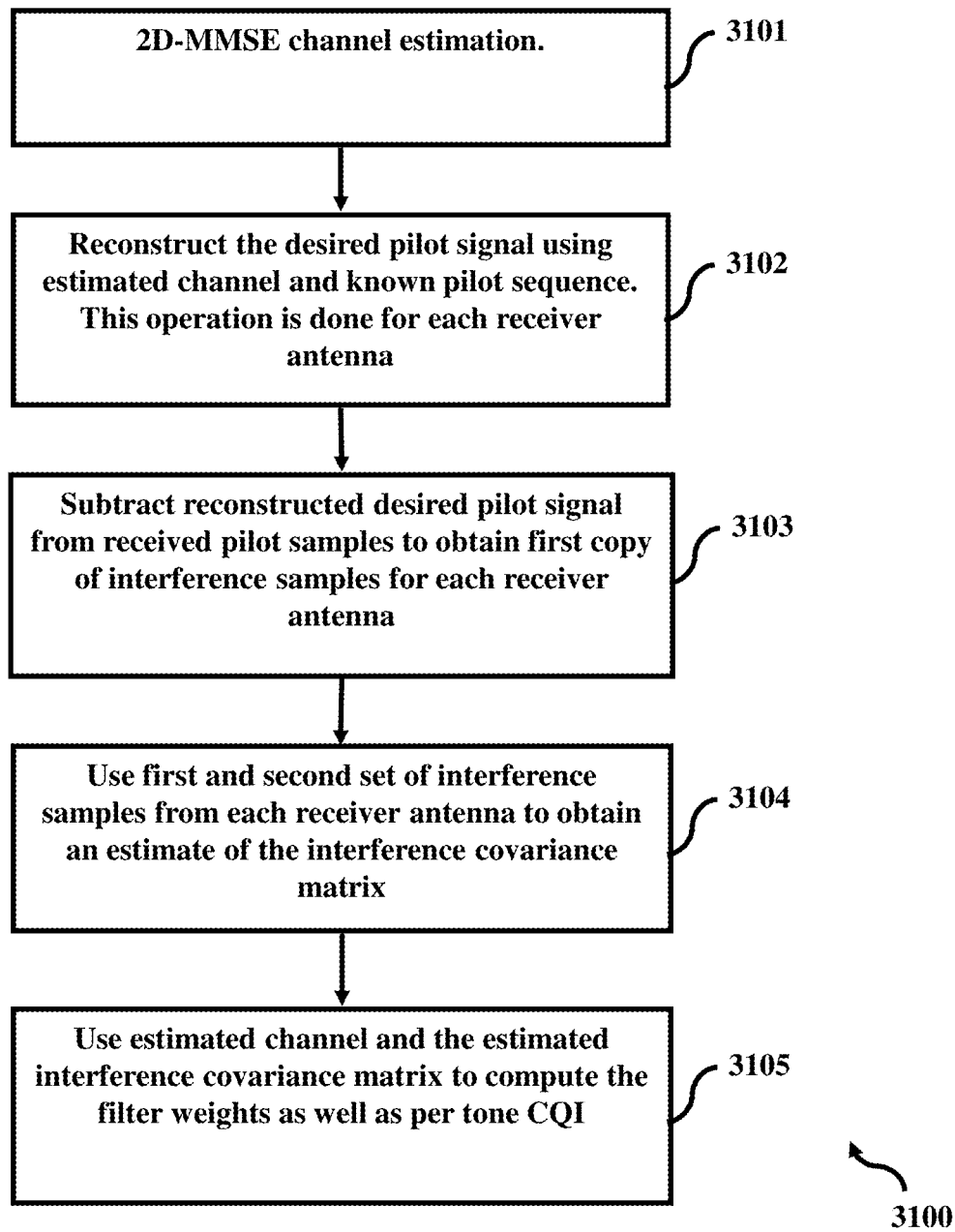
FIG. 31 is a flow chart depicting a method showing the steps involved in a multi-antenna receiver utilizing COFIP, according to an embodiment herein.
Figure 32:
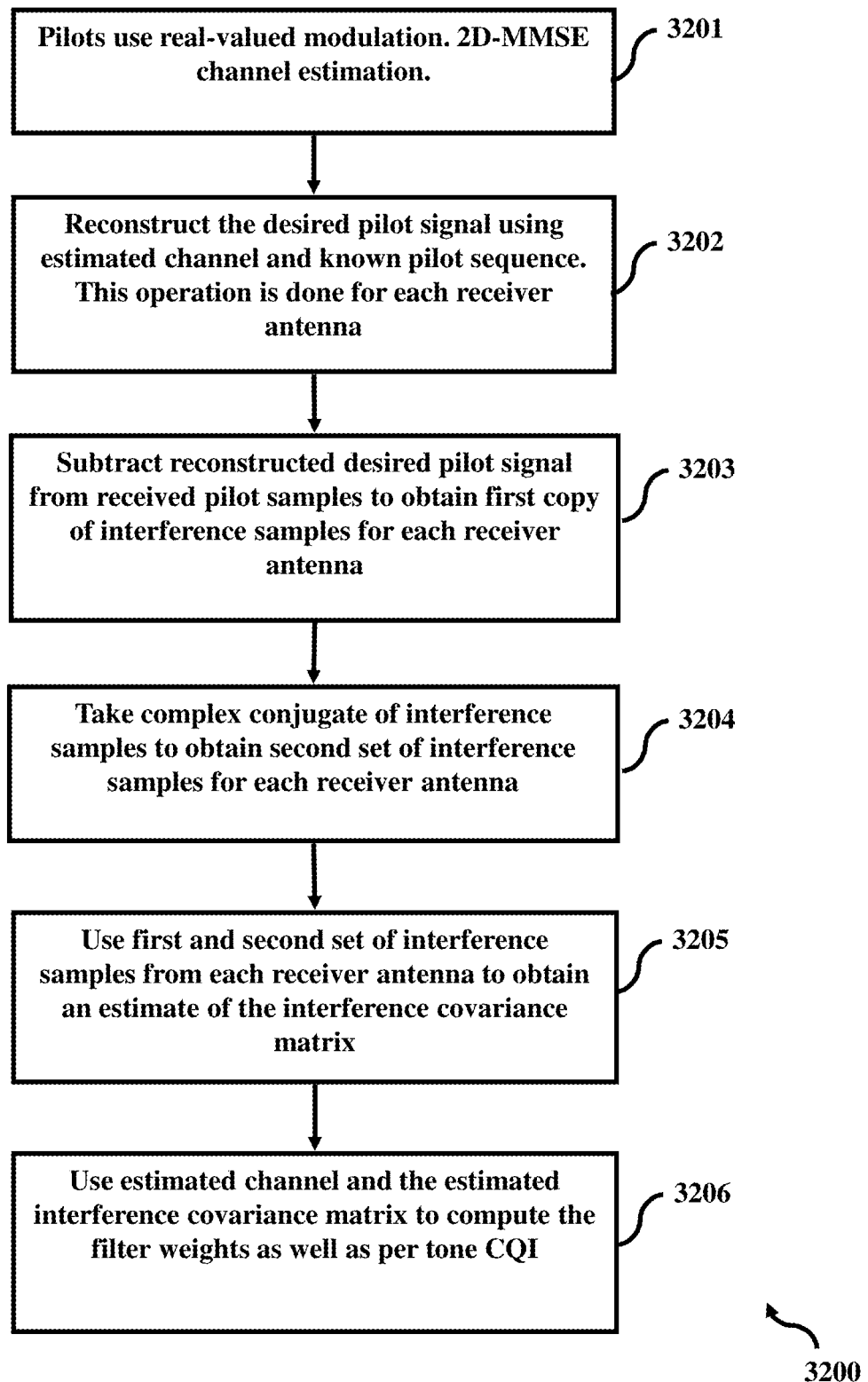
FIG. 32 is a flow chart depicting a method showing the steps in a CDR multi-antenna receiver utilizing COFIP, according to an embodiment herein.
Figure 33:
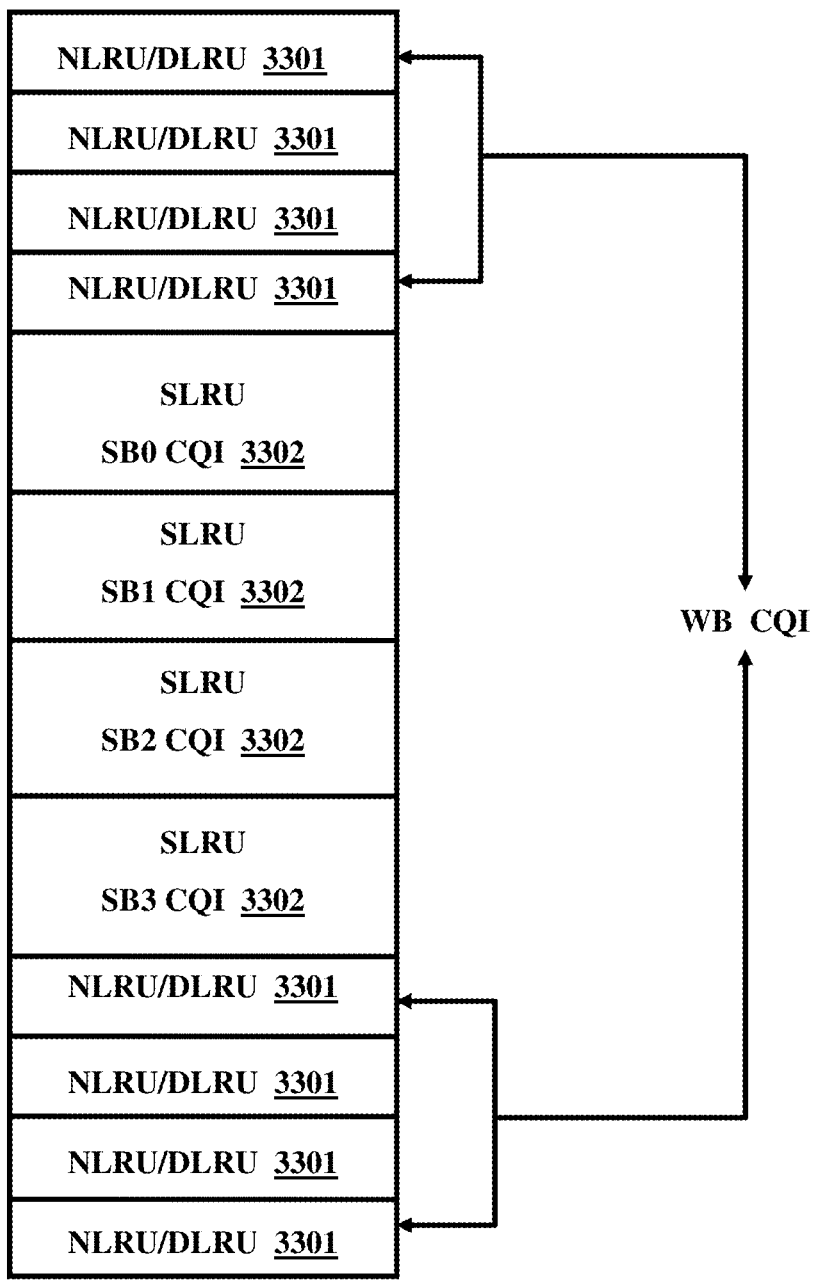
FIG. 33 illustrates CQI computation for subbands and minibands, according to an embodiment herein.

FIG. 31 is a flow chart depicting a method showing the steps involved in a multi-antenna receiver utilizing COFIP. If pilots use real-valued modulation such as BPSK, the receiver first performs 2D-MMSE channel estimation in conventional manner. The receiver uses the estimated channel states (3101) and the knowledge of known pilots to construct the desired pilot signal. The reconstructed pilot (3102) signal is subtracted (3103) from the received pilot signal to obtain the interference samples. Since interference also uses real-valued pilots, the receiver collects the complex and complex conjugate copies of the interference samples and uses them for covariance estimation of the CDR encoded interferers contained in the pilot samples. This covariance estimate is designated as first covariance estimate. In the second step, the interference samples are collected from the first set of null tones containing interference from sectors with same cell ID. The complex-conjugated copy of the interference samples is collected. Both the observations are used to construct a second interference covariance estimate.

In the third step, the interference samples are collected from the second set of null tones containing interference from sectors with same cell ID. The complex-conjugated copy of these interference samples are then collected and both the observations are used to construct a third interference covariance estimate (3104). In another embodiment, all the three covariance estimates are combined (3105) to estimate the total covariance. The receiver uses the estimated channel and the total covariance to obtain a set of weights for filtering. In other embodiments, covariance estimate from pilot signal may not be used to obtain the total covariance. In COFIP mode, if pilots are transmitted in conjugate pairs, covariance estimation step uses the complex and complex conjugate copies of the interference samples for estimation. CDR receiver generally suppresses 2Nr−1 interferers in a distributed mode. However with localized post-processing SINR based multi-user scheduling (such as proportional fair scheduling), the scheduler quite often selects a user in a certain sub-band where CDR encoded signal and interference channels combines (or aligns) in such a manner that leads to suppression of more than 2Nr−1 interferers. OL CDR region with fixed set of rank-1 precoders along with post-processed SINR scheduling can handle more than 5-6-dominant interferers. Since, COFIP pilot structure ensures accurate estimates of CQI through accurate channel and interference covariance measurement, the base station will be able to perform scheduling and MCS allocation accurately.

In another embodiment COFIP is used in rank-1 OL region without CDR encoding. While OL region provides a stable interference environment with fixed multi-antenna precoders, the multi-antenna MMSE-type receiver provides high interference suppression gain in both sub-band localized and mini-band distributed modes. Especially in localized mode where scheduling is based on the post-processed SINR of the MMSE receiver, the scheduler tends to allocate users with high SINR (or CQI) high interference suppression gain. Although conventional MMSE receiver can only suppress Nr−1 interferers in a conventional system, localized post-processing SINR based scheduling quite often selects a user in a certain sub-band in which signal and interference channels combines (or aligns) in such a manner that leads to suppression of several dominant interferers. OL region with fixed set of rank-1 precoders along with post-processed SINR schedules can handle more than 2-dominant interferers. COFIP pilot structure is an important element in realizing the full benefit of rank-1 OL region with post-processing SINR based multi-user scheduling.

Figure 29:
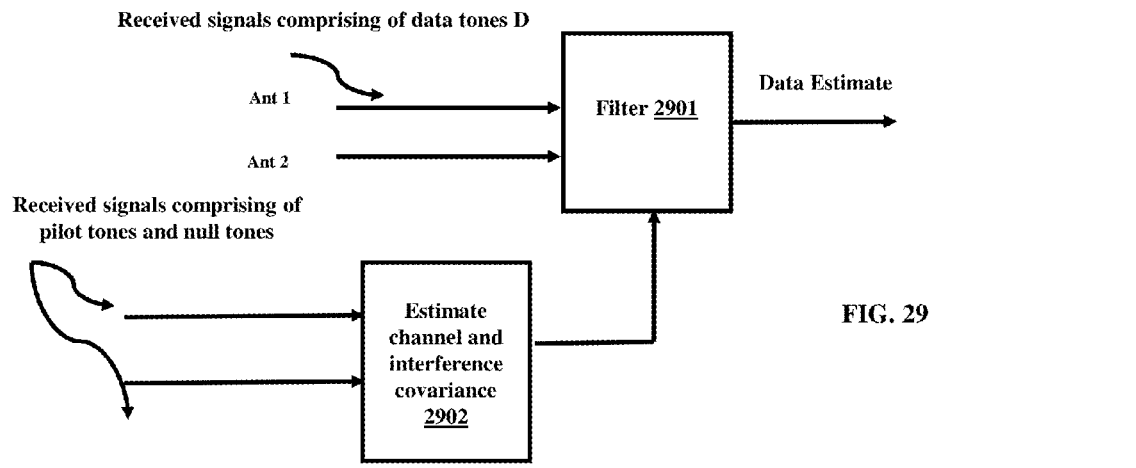
FIG. 29 illustrates a multi-antenna receiver, according to an embodiment herein.

FIG. 29 illustrates conventional multi-antenna MMSE type receiver. In the figure the symbol ( )* 3001 denotes complex conjugation operation. In rank-1 OL region, the receiver receives a rank-1 precoded desired signal and several rank-1 precoded interferers. Each of the Nr received signals are filtered and combined to obtain a decision metric for demodulation. Filtering includes weighing of the received signal with a real/complex weight and summing up the weighted signals to obtain a decision metric for demodulation. The weights are obtained by minimizing the mean-square-error or by maximizing the post-processing SINR of the receiver. Computation of weights takes into account an estimate of the channel state information of the desired signal and covariance of the rank-1 precoded interferers plus background noise. The filtered signal is used for demodulation of transmitted modulation data. FIG. 29 illustrates the receiver structure for 2-receiver antenna case.

The receiver first performs 2D-MMSE channel estimation in conventional manner. Referring to FIG. 31, in each sector, null tones are depicted with grey background denote first set of null tones and null tones are depicted without grey background denote second set of null tones. In COFIP mode, interference covariance is estimated in several steps. The receiver uses the estimated channel states (3201) and knowledge of known pilots to construct the desired pilot signal. The reconstructed pilot signal (3202) is subtracted (3203) from the received pilot signal to obtain the interference samples. This covariance estimate is designated as first covariance estimate. The interference samples collected from the first set of null tones which contain interference from sectors with same cell ID. Both observations are used to construct (3204) a second interference covariance estimate. The interference samples collected from the second set of null tones contain interference from sectors with same cell ID. Both observations are used to construct (3205) a third interference covariance estimate. In an embodiment, all the three covariance estimates are combined to estimate the total covariance (3206). Receiver uses the estimated channel and the total covariance to obtain a set of weights for filtering. In some embodiments, covariance estimate from pilot signal may not be used to obtain the total covariance.

The interference cancellation gain of the MMSE receiver is highly dependent on the quality of the 'interference plus noise' covariance matrix estimate. A particular low-complexity method for estimating 'interference plus noise' covariance matrix is described as follows:

$y_{m,k,n}$ is the measured signal at $n^{th}$ receiver antenna at the $k^{th}$ pilot location corresponding to the sector number m.

$I_{m,k,n}$ is the interfering signal at $n^{th}$ receiver antenna at the $k^{th}$ pilot location corresponding to the sector number m.

$H_{k,n}$ is the fading channel coefficient at $n^{th}$ receiver antenna at the $k^{th}$ pilot location of the desired sector.

$P_k$ is the pilot tone transmitted by the desired sector at the $k^{th}$ pilot location C is the Interference plus noise Covariance matrix.

MaxSecNo is equal to N−1, where N is the number of sectors in a cell
mySecNo is the desired Sector number of the subscriber
NoPilots is equal to the number of pilots with in a PRU
$N_r$ is the number of Receiver antennae The interference samples of the desired sector at each pilot location are obtained by removing the signal component from the received signal. The interference samples of the desired sector at each pilot location is given by $I_{m,k,n} = y_{m,k,n} - H_{k,n} * P_k$;

In CDR mode, the interference sample and its complex conjugate are collected in a column vector format. The interference covariance matrix is estimated at all the pilot locations from the samples thus obtained for the desired sector. The interference covariance of the remaining sectors with different number is estimated from the received samples at their pilot locations. The interference covariance obtained using the above steps are added to get the overall interference covariance estimate.

```
For m = 0 : MaxSecNo {
  if(m == mySecNo ) {
    For k = 0 : NOPilots
    {
      I m,k,n = y m,k,n − H k,n *P k;
      I m,k =[I m,k,0 I m,k,1 ... I m,k,Nr−1]^T
      if(CDRmode=on)
      I m,k =[I m,k conj( I m,k)]^T
      }
      C = C + I m,k I m,k^H
    }
  }
  Else
  {
    I m,k,n = Y m,k,n
    I m,k =[I m,k,0 I m,k,1 ... I m,k,nr−1]^T
    if(CDRmode=on)
    I m,k =[I m,k conj( I m,k)]^T
    }
    C = C + I m,k I m,k^H
  }
}
```

The pilot structure in embodiments herein enables efficient implementation of multi-user channel estimation and various advanced receivers. For example, the channel state information of a set of dominant interferers and residual noise-plus-interference covariance can be estimated from the zero-tone locations. If the pilot sequences are pre-planned using a pilot planning method, then the pilots used by the dominant interferers is known a-priori to the receiver. The channel states of various dominant interferers can be used in one of the following implementations:

Construct the covariance of interference explicitly using the dominant interfering channel state information and the residual covariances.

Use a multi-user joint demodulator preceded by a noise-whitening filter that whitens the residual noise+interference.

The techniques are applicable to both CDR and non-CDR receivers

In an embodiment, OL rank-1 precoding and COFIP are employed together with either CDR or non-CDR mode to obtain high interference suppression gain. The output of the MIMO encoder is denoted as x which is a $M_t \times 1$ vector. The output vector ($N_t \times 1$) of the precoder z=W.x. $M_t$ is the number of MIMO streams, $N_t$ is the number of transmit antennas, and W is the $N_t \times M_t$ precoding matrix. In Rank-1 precoding and non-CDR transmission, x is a scalar and W is the precoding vector. In the case of CDR encoding, $x=[s_1 \ s_1^*]$ the modulation symbol $s_1$ is taken and sent along with the complex conjugate of in $s_1$ consecutive subcarriers.

The MIMO schemes are suitable for cell-edge in reuse 1 cellular systems because of their ability to suppress heavy interference with low complexity. The COFIP pilot structure is very useful in both CDR as well as non-CDR transmission because it enables the receiver to estimate the channel, interference covariance, channel quality indicators (CQI) etc. accurately, even in the presence of heavy interference. This makes COFIP the most suitable pilot structure for the cell-edge in reuse 1 cellular systems.

In the downlink non-adaptive precoding, the W matrix for each Physical resource unit (PRU) is selected in a fixed way by the Base station. In 802.16m, the matrix W changes every N PRUs in frequency. Outside and inside the OL region $N=N_1=4$ and there is no change of precoders in time. This is called $N_1$ cycling. As the set of $N_1$ contiguous PRUs in frequency is defined as a sub-band, the precoder is changed every sub-band. The precoding matrix W applied in physical subband 's' is selected as the codeword of index i in the codebook where i is given by: $i=s \bmod N_w$, $s=0, 1 \ldots N_{sub}-1$ where Nsub denotes the number of physical subbands across the entire system bandwidth. $N_w$ is the number of codewords in the codebook.

In the OL region of type 1 with block distributed allocation, N=N2, and the Nt×1 precoding matrix W applied in PRU 'm' in the subframe number 't' is selected as the codeword of index i in the codebook where i is given by $$i = (m + (t \bmod 1)) \bmod N_w, \quad m = 0, 1 \ldots N_{PRU} - 1.$$

In an embodiment, the index i is given by $$i(m) \bmod N_w, \quad m = 0, 1 \ldots N_{PRU} - 1.$$

$N_{PRU}$ is the number PRUs across the entire system bandwidth. As the set of $N_2$ contiguous PRUs in frequency is collectively defined as a mini-band, the precoder is changed every mini-band.

The precoding matrix W is selected as the codeword of index i in the codebook. For 2-Tx antennas, the elements of the code book may be chosen as:

$$C(1) = \frac{1}{\sqrt{2}} \begin{bmatrix} 1 \\ j \end{bmatrix}, \quad C(2) = \frac{1}{\sqrt{2}} \begin{bmatrix} 1 \\ -j \end{bmatrix}.$$

In an alternative embodiment, for 2-Tx antennas, the entries of the code book C are given by:

$$C(1) = \frac{1}{\sqrt{2}} \begin{bmatrix} 1 \\ 1 \end{bmatrix}, \quad C(2) = \frac{1}{\sqrt{2}} \begin{bmatrix} 1 \\ -1 \end{bmatrix}, \quad C(3) = \frac{1}{\sqrt{2}} \begin{bmatrix} 1 \\ j \end{bmatrix},$$

$$C(4) = \frac{1}{\sqrt{2}} \begin{bmatrix} 1 \\ -j \end{bmatrix}, \quad C(5) = \frac{1}{\sqrt{2}} \begin{bmatrix} 1 \\ \frac{1+j}{\sqrt{2}} \end{bmatrix}, \quad C(6) = \frac{1}{\sqrt{2}} \begin{bmatrix} 1 \\ \frac{-1-j}{\sqrt{2}} \end{bmatrix},$$

$$C(7) = \frac{1}{\sqrt{2}} \begin{bmatrix} 1 \\ \frac{-1+j}{\sqrt{2}} \end{bmatrix}, \quad C(8) = \frac{1}{\sqrt{2}} \begin{bmatrix} 1 \\ \frac{-1-j}{\sqrt{2}} \end{bmatrix}.$$

One may choose all the elements or certain sub set from the above code book. In yet another embodiment, the following code book may be used:

$$C(1) = \begin{bmatrix} 1 \\ 0 \end{bmatrix}, C(2) = \begin{bmatrix} 0 \\ 1 \end{bmatrix}.$$

For 4-Tx antennas, single stream, transmission, the preferred entries of the code book are given by:

$$C(1) = \frac{1}{\sqrt{4}} \begin{bmatrix} 1 \\ 1 \\ 1 \\ -1 \end{bmatrix}, C(2) = \frac{1}{\sqrt{4}} \begin{bmatrix} 1 \\ -1 \\ 1 \\ 1 \end{bmatrix},$$

$$C(3) = \frac{1}{\sqrt{4}} \begin{bmatrix} 1 \\ j \\ -1 \\ j \end{bmatrix}, C(4) = \frac{1}{\sqrt{4}} \begin{bmatrix} 1 \\ -j \\ -1 \\ -j \end{bmatrix}$$

In an alternative embodiment the following entries may be chosen for single stream 4-Tx case:

$$C(1) = \frac{1}{\sqrt{4}} \begin{bmatrix} 1 \\ 1 \\ 1 \\ 1 \end{bmatrix}, C(2) = \frac{1}{\sqrt{4}} \begin{bmatrix} 1 \\ -1 \\ 1 \\ -1 \end{bmatrix}, C(3) = \frac{1}{\sqrt{4}} \begin{bmatrix} 1 \\ 1 \\ -1 \\ -1 \end{bmatrix}, C(4) = \frac{1}{\sqrt{4}} \begin{bmatrix} 1 \\ -1 \\ -1 \\ 1 \end{bmatrix}$$

For 4-Tx case one may use the code book with following elements:

$$C(1) = \begin{bmatrix} 1 \\ 0 \\ 0 \\ 0 \end{bmatrix}, C(2) = \begin{bmatrix} 0 \\ 1 \\ 0 \\ 0 \end{bmatrix}, C(3) = \begin{bmatrix} 0 \\ 0 \\ 1 \\ 0 \end{bmatrix}, C(4) = \begin{bmatrix} 0 \\ 0 \\ 0 \\ 1 \end{bmatrix}$$

The elements of code book for 8-Tx case may be chosen as:

$$C(1) = \frac{1}{\sqrt{8}} \begin{bmatrix} 1 \\ e^{j\pi Sin(\theta_l)} \\ e^{j2\pi Sin(\theta_l)} \\ e^{j3\pi Sin(\theta_l)} \\ e^{j4\pi Sin(\theta_l)} \\ e^{j5\pi Sin(\theta_l)} \\ e^{j6\pi Sin(\theta_l)} \\ e^{j7\pi Sin(\theta_l)} \end{bmatrix}$$

where $\theta_l = \left((l-1) + \frac{1}{2}\right)\frac{\pi}{4} - \frac{\pi}{23}$ and $l = 1, 2, \cdots, 16$ More generally, one may use the following code book for Mt Tx antennas. The code book is a column vector of length Mt where the l'th element of the code book contains a 1 in the l+th row and all other elements are zeros.

Rank-1 OL-region uses one MIMO stream CDR encoding or non-CDR encoding. Localized and block distributed allocation of data is allowed in this region. Rank-1 OL MIMO region shall use Collision Free Interlaced Pilot (COFIP) pattern. FIGS. 8, 9, 10 shows the COFIP pattern for AAI subframes consisting of 6 OFDM symbols. A predetermined set of PRUs may transmit null tones in the pilot locations of BSs having a Cell ID which is different from its own BS. Null tones are introduced in the 1-stream interlaced pilot pattern as shown in FIGS. 8, 9, 10. The index of the COFIP type used by a particular BS with Cell ID l=k is denoted by pk. The index of the COFIP type is determined by the Cell ID according to the following equation:

$$p_k = \text{floor}\left(\frac{k}{256}\right).$$

In another embodiment, the index of the COFIP type is determined by the Cell ID according to the following equation:

$$p_k = \text{mod}(k,3).$$

For AAI subframes consisting of 7 OFDM symbols, the first OFDM symbol which contains pilot tones and null tones in each pilot pattern set shown in FIGS. 8, 9, 10 is added as the 7th symbol. FIG. 11, 12, 13 shows the pilot pattern set for AAI subframes consisting of 5 OFDM symbols.

The pilot sequences assigned to different cells should have good cross correlation properties. For example, the PRBS generator shown in the FIG. 21 may be used to generate the pilot sequences for 802.16m single stream pilot pattern. The characteristic polynomial for PRBS generator is $X^3+X+1$. The PRBS has a periodicity of 7 samples and only the first 6 samples are used for deriving pilots since there are only 6 pilots with in a PRU.

The pilot symbols $P_k$ within a PRU are derived from $W_k$ as follows $P_k=(2*W_k-1)*\text{sqrt}(P_s)$ where $P_s$ is the pilot tone power. Where k=0 to 5. Different nonzero vectors $[b_2 \, b_1 \, b_0]$ are used to initialize the PRBS generator in order to produce the code set C, which contains 7 pilot sequences.

Figure 15:
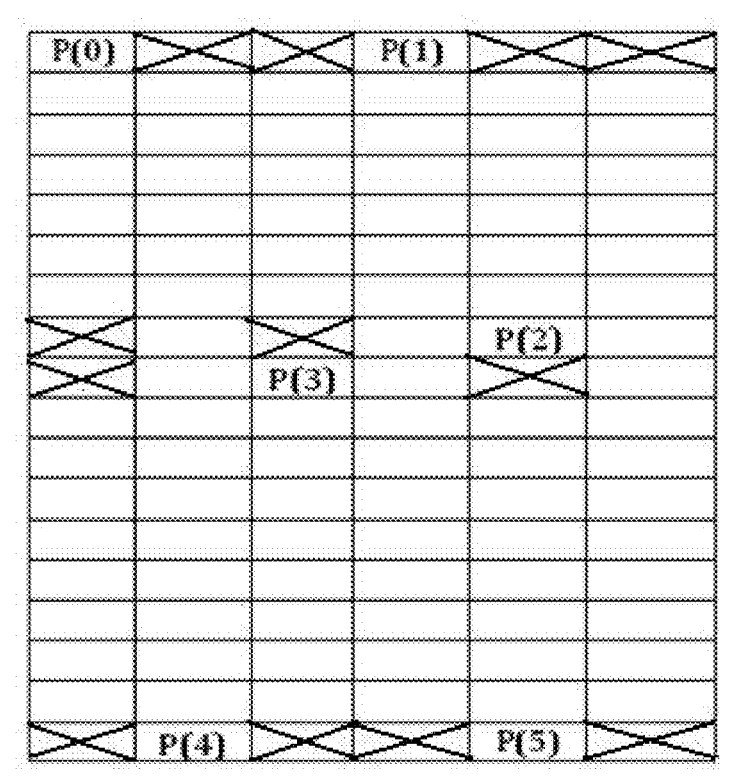
Figure 16:
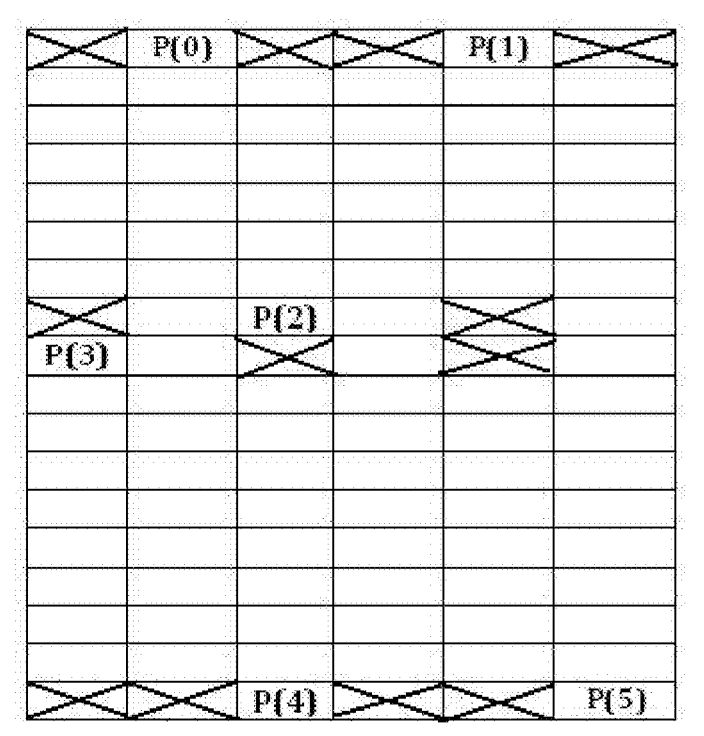
Figure 17:
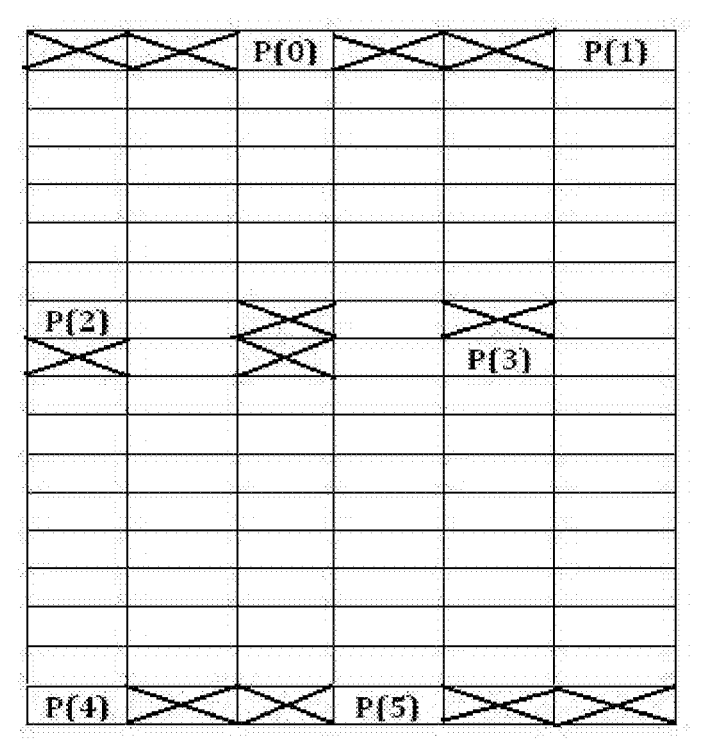

Pilot codebook P={P(0), P(1), P(2), P(3), P(4), P(5),} is defined in table 1 where P(i), i=0, 1 . . . , 5 denote the pilot values carried in a PRU. The location of the 6-pilot tones is shown in the COFIP pilot structure in FIGS. 15, 16 and 17 for AAI subframes with 6-OFDM symbols, and in FIGS. 18, 19 and 20 for AAI subframes with 5-OFDM symbols. For AAI subframes consisting of 7 OFDM symbols, the first OFDM symbol which contains pilot tones and null tones in each pilot pattern set shown in FIGS. 15, 16 and 17 are added as the 7th OFDM symbol.

Figure 22:
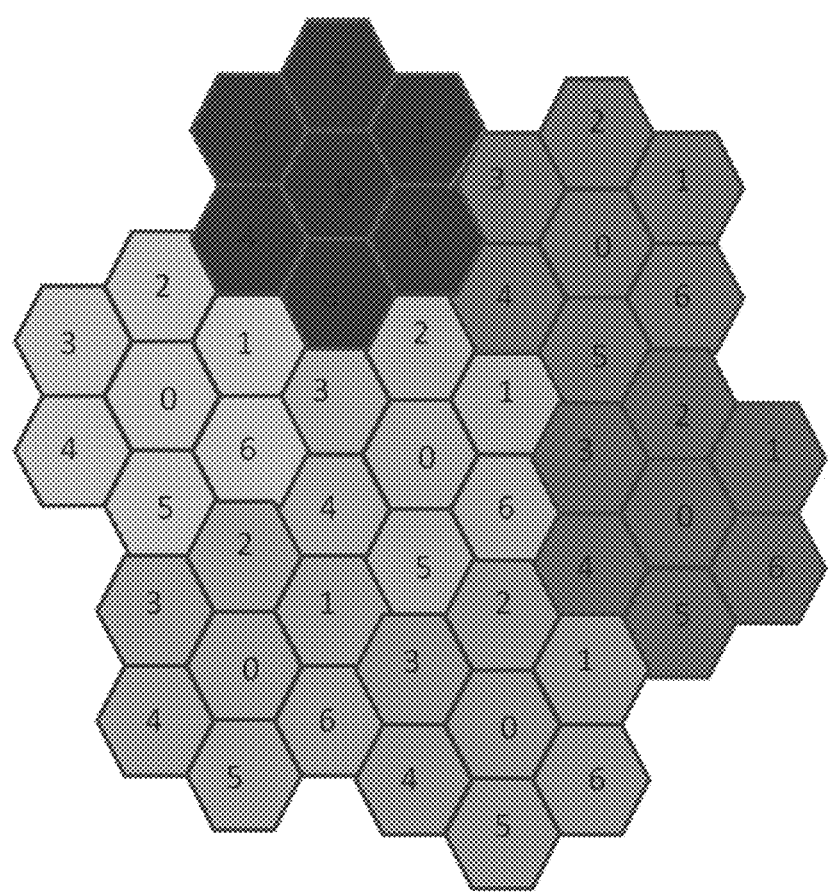
FIG. 22 illustrates Cellular Layout with reuse 7 pilot planning, according to an embodiment herein.
Figure 23:
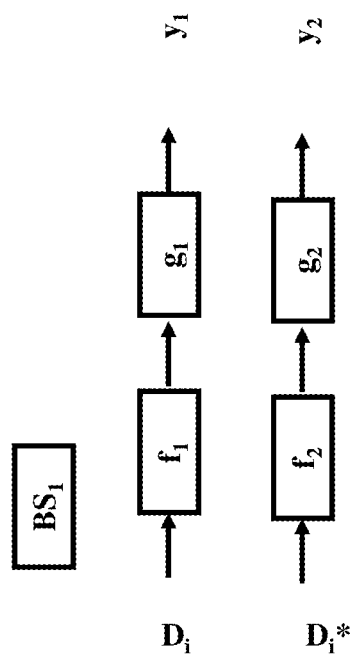
FIG. 23 illustrates CDR encoding with two transmitters, according to an embodiment herein.
Figure 23:
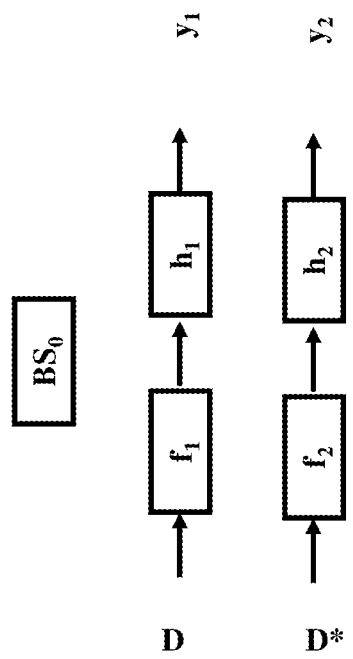

The PRBS generator can produce only 7 sequences with good cross correlation. Pilot planning is required to prevent two nearby base stations from using the same pilot sequence. For example a Reuse 1/7 pilot planning as shown in FIG. 22 may be used. The cells marked by same number use the same pilot sequences. The seven cells are grouped into a cluster and the cluster is repeated throughout the region.

TABLE 1

Pilot Modulation Sequences for COFIP

| Sequence Index | Pilot Modulation sequence |
| --- | --- |
| 0 | [−1 −1 1 1 1 −1] |
| 1 | [−1 1 −1 −1 1 1] |
| 2 | [−1 1 1 1 −1 1] |
| 3 | [1 −1 −1 1 1 1] |
| 4 | [1 −1 1 −1 −1 1] |
| 5 | [1 1 −1 1 −1 −1] |
| 6 | [1 1 1 −1 1 −1] |

Pilot sequence cycling in time and/or frequency is implemented to exploit the advantage of interference averaging on the pilots The pilot sequences, generated in this way, which are used to modulate the COFIP pilot subcarriers, shall be obtained from the set of pilot modulation sequences defined in Table 1. The sequence index used for modulation of PRU pilot subcarriers is derived from i=mod(s+t+mod(mod (Cell ID 256), 7),7), where 's' is the physical PRU index, 't' is the physical subframe index. Alternatively, the base pilot code sequences to be used by an MS can be communicated in a control channel.

The CQI feedback together with the STC rate feedback (when applicable) composes the spectral efficiency value reported by the AMS. This value corresponds to the measured block error rate which is the closest, but not exceeding, a specific target error rate. The Receiver computes Channel quality indicator (CQI) and feeds back to the BS. Usually, The MS's preferred MCS level in a band is the CQI. In 802.16m. There are two modes of CQI
1. Sub-band CQI, SB-CQI (for sub-bands)
2. Wide Band CQI, WB-CQI (for mini-bands)
The MS feeds back SB-CQI for all sub-bands and one WB-CQI in the frequency partition where it is scheduled.

In the OL-region, as the precoders and the number of MIMO streams are fixed over time, the CQI computed using the output SINR's of the receiver is very reliable. When a user is scheduled, the CQI available from that user from its previous measurements is valid at the present. The only mismatch is from the channel/interference covariance measurement errors. The COFIP structure minimizes the errors. The combination of Open loop region and COFIP is very much suitable for accurate CQI information at the Base station for efficient multi-user scheduling.
The CQI computation in the open-loop region involves the following steps
1. Compute post-receiver SINR at each tone (or tone pair, if modulation symbols are spread over two subcarriers) for the receiver under consideration i.e., CDR of non-CDR receiver.
2. Calculate an equivalent AWGN SINR from the set of SINRs (which is computed in step 1) in the Resource Unit, using methods like Avg SINR, RBIR or MMIB.
3. From the AWGN tables (SINR-BLER) of all the MCSs, find out the best MCS which gives the maximum spectral efficiency and satisfies BLER<$BLER_{threshold}$ ($BLER_{threshold}$=0.1 or 0.01). Spectral efficiency=$\log_2$ (Modulation size)*code rate*(1−BLER).
4. MS reports sub-band CQI for each sub-band in its frequency partition and a single wide-band CQI for all the mini-bands.
5. In the case of $N_1$ cycling, where the precoder is fixed in every subframe, CQI computation can be done using any one of the subframes where precoded pilots are transmitted. In $N_2$ cycling, the precoder is fixed in every 2 subframes, CQI computation can be done using two consecutive subframes.

The DL OL region consists of a rank-1 OL MIMO region in which only a single data stream is transmitted across multiple antennas and uses single stream rank-1 OL precoding. The precoder is kept constant for the duration of the resource block (RB) and the precoder may change from one resource block to another.

In the OL region, the precoder which is used in each RB is pre-defined. Data and pilots in each RB are precoded using the same precoder. In the OL MIMO region, in a predefined number of subframes, the dedicated pilots shall be transmitted in each PRU even though data is not scheduled in that PRU. We refer to these pilots as "always ON" pilots. In the remaining sub frames, dedicated pilots shall be transmitted in each PRU only if data is transmitted in that PRU.

The always ON pilot can be transmitted in the first or last "u" subframes of the allocated downlink frame. The value of "u" can be 0, 1, 2 or 3. Or, the always ON pilots can be transmitted over any two "p" number of subframes in the allocated DL frame where p can take values 0,1, 2, or 3. Or, the pilots are ON in all the subframes allocated in the OL region, i.e., pilot tones are always transmitted even-though data is not transmitted in those resources. The always ON pilot in select subframes concept can be used in CDR, OL multi-user (MU) MIMO. It can also be used for SFBC/SM which is implemented in DRUs.

The receiver estimates channel quality information (CQI) using the precoded pilots which are kept ON. The CQI is estimated as the post-processing SINR of the receiver used by the MS. If the pilot structure uses a combination of pilot tones and null tones, CQI can be estimated using the signal samples which received during the pilot tones and null tones. The MS computes the best-band CQI for a set of sub-bands (best-M bands where the value of M is configured by the system) and wideband CQI as well. This CQI information is feedback to the BS along with the indices of best sub bands. BS uses the CQI for multi-user scheduling and modulation and coding scheme (MCS) allocation. The region in which the system uses dedicated pilots (pilots on only if data is ON), the receiver preferably estimates the interference covariance information from each RB independently. Since the number of interferers may change from RB to RB it is preferable to confine interference covariance estimation to RB of interest. In other embodiments, the rank-1 OL region may be divided into two regions: rank-1+COFIP+non-CDR region and rank-1+CDR+COFIP regions. The system may employ both regions at a time or one of the two regions at a time.

In rank-1 OL MIMO CDR region, the data its complex conjugate are mapped together in adjacent OFDM tones. The same encoding is applied in all base stations synchronously across the network. OL rank-1 precoding is also applied in all PRUs in the network. The precoder is pre-specified in this region. All PRUs transmitted in this region employs CDR encoding with COFIP structure.

In rank-1 OL MIMO non-CDR region does use CDR encoding. In this region, OL rank-1 precoding is applied in all PRUs in the network. The precoder is pre-specified in this region. All PRUs transmitted in this region employs COFIP structure. In the subband mode, the MS reports post-processing SINR (CQI) conventional MMSE receivers for best-M bands where M is an integer (set by the BS). Base station uses proportional fair (PF) type scheduling to determine the user allocation in the subbands. In the wideband mode, the MS reports post-processing SINR (CQI) of MMSE receiver for the allocated set of distributed min-bands. Base station uses proportional fair (PF) type scheduling to determine the user allocation in the minibands based on wideband CQI.

In CDR region, in the subband mode, the MS reports post-processing SINR (CQI) of CDR MMSE receiver for best-M bands where M is an integer (set by the BS). Base station uses proportional fair (PF) type scheduling to determine the user allocation in the subbands. In the wideband mode, the MS reports post-processing SINR (CQI) of CDR MMSE receivers for the allocated set of distributed min-bands. Base station uses proportional fair (PF) type scheduling to determine the user allocation in the allocated min-band PRUs based on wide band CDR CQI.

Users with very low SINR and having interference from more than 2-interferers can use CDR otherwise the user may be placed in non-CDR mode. The split between rank-1 and CDR region is done by BS in a semi static manner. The resources which allocated for these regions are signaled by the base station.

In some cases, the system may contain a mix of single and multi-antenna transmitters. In those cases, CDR and COFIP may be used in a rank-1 region where MSs may use either OL or CL rank-1 precoders or a mix of both. This type of scenario typically happen in uplink. Similarly, one can define a non-CDR COFIP region where either OL or CL or a mix of OL and CL transmissions are allowed.

The embodiments disclosed herein are not limited to cellular type system where base stations communicate to mobile stations and vice versa. The inventive concepts can be applied to communication between relays/Femto cells (or random networks) and mobile/nomadic receivers, or in systems where base stations, relays and Femtos co-exist in the same system. In systems with large number of dominant interferers, reuse 6 or reuse 7 COFIP is preferable for accurate CQI estimation. In random networks, the pilot interlace to be used in that base station/sector may be signaled to the MS explicitly in a control message.

In various embodiments, sector is not limited to a sector in cellular networks. A sector may be defined by any transmitter (including but not limited to Femto cells and relays) covering an area around it. The area covered may be partial (<360 degrees) or complete (360 degrees).

The embodiments disclosed herein can be implemented through at least one software program running on at least one hardware device and performing network management functions to control the network elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method of implementing a receiver in a wireless communication network that transmits data using a plurality of antennas, said network using a unique pilot pattern corresponding to a sector number of a sector such that no two sectors with different sector numbers have pilots in same location in their respective pilot patterns, wherein said pilot pattern comprises of pilot tones and null tones, said method comprising:
estimating a channel;
obtaining interference samples of desired sector at each pilot location by removing signal component from received signal;
estimating a first interference covariance at all pilot locations from said samples for said desired sector;
estimating a second interference covariance from said null tones;
adding said first and second interference covariances obtained to get overall interference covariance estimate; and
determining weights for a filter at said receiver.

2. The method as in claim 1, wherein in said network, a single data stream is transmitted across said plurality of antennas in each said sector, where a pre-defined precoder is kept constant for the duration of a resource block (RB) or groups of RBs, and where data and pilots in each said RB are precoded using a same precoder.

3. The method as in claim 2, wherein said network uses open loop (OL) region.

4. The method as in claim 1, wherein said method further comprising:
repeating data symbols over one or more subcarriers by said network, and
encoding said repeated data symbols using any one or both of complex conjugation and phase variation, wherein said encoding of said repeated data symbols is synchronized in multiple spatially separated transmitters.

5. The method as in claim 4, wherein in said network, a single data stream is transmitted across said plurality of antennas in each said sector, where a pre-defined precoder is kept constant for the duration of a resource block (RB) or groups of RBs, and where data and pilots in each said RB are precoded using a same precoder.

6. The method as in claim 5, wherein said network uses open loop (OL) region.

7. The method as in claim 1, wherein said method further comprising:
computing post-receiver signal to interference plus noise ratio (SINR) for all tones to compute a channel quality indicator (CQI) at said receiver.

8. The method as in claim 7, wherein said method further comprising:
determining at least one of sub-band CQI for all sub-bands and wide band CQI; and
feeding back at least one of said sub-band CQI, for all or best-M sub-bands along with sub-band indices of said best-M sub-bands, and said wide band CQI.

9. The method as in claim 7, wherein in said network, a single data stream is transmitted across plurality of antennas in each said sector, where a predefined precoder is kept constant for the duration of a resource block (RB) or groups of RBs, and where data and pilots in each said RB are precoded using a same precoder.

10. The method as in claim 9, wherein said network uses open loop (OL) region.

11. The method as in claim 10, wherein said method further comprising:
determining at least one of sub-band CQI for all sub-bands and wide band CQI; and
feeding back at least one of said sub-band CQI, for all or best-M sub-bands along with sub-band indices of said best-M sub-bands, and said wide band CQI.

12. The method as in claim 7, wherein said method further comprising:
repeating data symbols over one or more subcarriers by said network, and
encoding said repeated data symbols using any one or both of complex conjugation and phase variation, where said encoding of said repeated data symbols is synchronized in multiple spatially separated transmitters.

13. The method as in claim 12, wherein said method further comprising:
determining at least one of sub-band CQI for all sub-bands for distributed allocation and wide band CQI for distributed allocation; and
feeding back at least one of said sub-band CQI for all or best-M sub-bands along with said sub-band with indices of said best-M sub-bands and said wide band CQI.

14. The method as in claim 12, wherein in said network, a single data stream is transmitted across said plurality of antennas in each said sector, where a pre-defined precoder is kept constant for the duration of a resource block (RB) or groups of RBs, and where data and pilots in each said RB are precoded using a same precoder.

15. The method as in claim 14, wherein said network uses open loop (OL) region.

16. The method as in claim 15, wherein said method further comprising:
  determining at least one of sub-band CQI for all sub-bands and wide band CQI; and
  feeding back at least one of said sub-band CQI, for all or best-M sub-bands along with sub-band indices of said best-M sub-bands, and said wide band CQI.

17. A receiver in a wireless communication network that transmits data using a plurality of antennas, said receiver comprising at least one means for receiving and demodulating signal transmitted in said network where a unique pilot pattern is assigned corresponding to a sector identified by a sector number such that no two sectors with different sector numbers have pilots in same location in their respective pilot patterns, wherein said pilot pattern comprises of pilot tones and null tones, wherein an index of a type of said unique pilot pattern used by a transmitter is determined by at least one of network parameters and interference load conditions, and wherein said at least one of network parameters comprises a cell Identification (ID) corresponding to said transmitter.

18. A receiver in a wireless communication network that transmits data using a plurality of antennas, said network using a unique pilot pattern corresponding to a sector number of a sector such that no two sectors with different sector numbers have pilots in same location in their respective pilot patterns, wherein said pilot pattern comprises of pilot tones and null tones, said receiver comprising at least one means for:
  estimating a channel;
  obtaining interference samples of desired sector at each pilot location by removing signal component from received signal;
  estimating a first interference covariance at all pilot locations from said samples for said desired sector;
  estimating a second interference covariance from said null tones;
  adding said first and second interference covariances obtained to get overall interference covariance estimate; and
  determining weights for a filter at said receiver.

19. The receiver as in claim 18, wherein said receiver further comprising:
  computing post-receiver signal to interference plus noise ratio (SINR) for all tones to compute a channel quality indicator (CQI).

20. The receiver as in claim 19, wherein said receiver further comprising:
  determining at least one of sub-band CQI for all sub-bands and wide band CQI; and
  feeding back at least one of said sub-band CQI, for all or best-M sub-bands along with sub-band indices of said best-M sub-bands, and said wide band CQI.

21. The receiver as in claim 20, wherein in said network, a single data stream is transmitted across said plurality of antennas in each said sector, where a predefined precoder is kept constant for the duration of a resource block (RB) or groups of RBs, and where data and pilots in each said RB are precoded using a same precoder.

22. The receiver as in claim 18, wherein said receiver further comprising repeating data symbols over one or more subcarriers by said network, and encoding said repeated data symbols using any one or both of complex conjugation and phase variation, where said encoding of said repeated data symbols is synchronized in multiple spatially separated transmitters.

23. The receiver as in claim 22, wherein said receiver further comprising:
  computing post-receiver signal to interference plus noise ratio (SINR) for all tones to compute a channel quality indicator (CQI).

24. The receiver as in claim 23, wherein said receiver further comprising:
  determining at least one of sub-band CQI for all sub-bands and wide band CQI; and
  feeding back at least one of said sub-band CQI, for all or best-M sub-bands along with sub-band indices of said best-M sub-bands, and said wide band CQI.

25. The receiver as in claim 24, wherein in said network, a single data stream is transmitted across said plurality of antennas in each said sector, where a predefined precoder is kept constant for the duration of a resource block (RB) or groups of RBs, and where data and pilots in each said RB are precoded using a same precoder.

\* \* \* \* \*